(12) United States Patent
Donertasli et al.

(10) Patent No.: US 12,294,487 B2
(45) Date of Patent: May 6, 2025

(54) STRUCTURE OF SYSTEM AND/OR DATA OF THE NEAR-RT RIC OF THE O-RAN

(71) Applicant: RAKUTEN MOBILE, INC., Tokyo (JP)

(72) Inventors: Hale Donertasli, Tokyo (JP); Madhukiran Medithe, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/017,130

(22) PCT Filed: Mar. 24, 2022

(86) PCT No.: PCT/JP2022/014031
§ 371 (c)(1),
(2) Date: Jan. 20, 2023

(87) PCT Pub. No.: WO2023/139806
PCT Pub. Date: Jul. 27, 2023

(65) Prior Publication Data
US 2024/0250870 A1    Jul. 25, 2024

(30) Foreign Application Priority Data
Jan. 18, 2022   (JP) .................. 2022-005950

(51) Int. Cl.
*H04L 41/0806* (2022.01)
*H04L 41/0894* (2022.01)

(52) U.S. Cl.
CPC ...... *H04L 41/0806* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 11,831,517 B2* | 11/2023 | Singh | G06F 9/45533 |
| 11,836,551 B2* | 12/2023 | Subramani Jayavelu | G06F 9/546 |
| 11,838,176 B1* | 12/2023 | Vanjare | G06F 9/4451 |
| 2021/0243086 A1 | 8/2021 | Shraboni et al. | |
| 2022/0014963 A1* | 1/2022 | Yeh | G06N 7/01 |

(Continued)

FOREIGN PATENT DOCUMENTS

JP   2021-083058 A   5/2021

OTHER PUBLICATIONS

"ITU Challenge: Build-a-Thon"; Team Automato Mehmet Karaca et al.; XP044326400; Nov. 1, 2021; pp. 1-17.

(Continued)

*Primary Examiner* — Quang N Nguyen
(74) *Attorney, Agent, or Firm* — Sughrue Mion, PLLC

(57) ABSTRACT

A class related to the xApp registration configuration is correlated to at least one of a class related to the xApp policy, a class related to the xApp messaging configuration, a class related to the xApp enrichment information, and a class related to the xApp API enablement configuration, in the Near-RT RIC (Near-Real Time RAN Intelligent Controller) of the O-RAN. A class related to the xApp registration configuration is correlated to a class related to the xApp RAN function, in the Near-RT RIC (Near-Real Time RAN Intelligent Controller) of the O-RAN.

12 Claims, 15 Drawing Sheets

(56) References Cited

U.S. PATENT DOCUMENTS

| | | |
|---|---|---|
| 2022/0038902 A1* | 2/2022 | Mueck .................... G06F 21/57 |
| 2022/0138587 A1* | 5/2022 | Chen ................. G06F 18/21342 |
| | | 706/45 |
| 2024/0015790 A1* | 1/2024 | Jamadagni ............ H04W 24/02 |
| 2024/0022923 A1* | 1/2024 | Arora .................... H04W 24/02 |
| 2024/0196376 A1* | 6/2024 | Wang .................... H04W 24/02 |
| 2024/0298184 A1* | 9/2024 | Montalvo .......... H04W 28/0925 |
| 2024/0422696 A1* | 12/2024 | Wang ................. H04L 25/0224 |

OTHER PUBLICATIONS

Robert Schmidt, et al.; "FlexRIC: An SDK for Next-Generation SD-RANs"; XP058778457; Dec. 2021; pp. 411-425.

"ITU Challenge: Build-a-Thon "; Team Automato Mehmet Karaca et al.; XP044382767; Sep. 3, 2021; pp. 1-16.

* cited by examiner

FIG. 4 xApp Runtime Data

| xAppContextData |
|---|
| ·xAppContextDataID:«generated» |
| ·xAppID:«FK» |
| ·xAppContextData |

| xAppA1EIMapping |
|---|
| ·xAppA1EIMapping:«generated» |
| ·xAppEIJobID:«FK» |
| ·xAppID:«FK» |
| ·eiJobID:«FK» |

| xAppA1PolicyMapping |
|---|
| ·xAppA1PolicyMapping:«generated» |
| ·xAppPolicyID:«FK» |
| ·xAppID:«FK» |
| ·policyID:«FK» |

| SDLNotification |
|---|
| ·SDLNotificationID:«generated» |
| ·xAppID:«FK» |
| ·E2NodeId:«FK» |

| xAppE2NodeRANFunctionMapping |
|---|
| ·xAppE2NodeRANFunctionMappingID:«generated» |
| ·xAppRANFunctionInstanceID:«generated» |
| ·xAppID:«FK» |
| ·E2NodeID:«FK» |
| ·xAppRANFunctionName:«FK» |
| ·E2NodeRANFunctionName:«FK» |

FIG. 5

Data Received from Non-RT RIC via A1

| nonRTA1EI |
|---|
| • eiJobID: «generated» |
| eiTypeID<br>eiTypeObject<br>eiJobObject<br>eiJobStatusObject |

| nonRTA1Policy |
|---|
| • policyID: «generated» |
| policyTypeID<br>policyObject<br>policyTypeObject<br>policyStatusObject |

FIG. 6

Subscriptions and Routing Data

MessagingRoute
- messagingRouteID: «generated»
- requestID: «FK»
- distributionID: «FK»
- messageType
- senderEndPoint(hostname/IP.port – InstanceID)
- receiverEndPoint(hostname/IP.port – InstanceID=

Distribution
- distributionID: «generated»
- requestID: «FK»
- xAppInstanceID
- E2TerminationInstanceID
- eventTrigger: (from RANSubFunction)
- actionID: (from RANSubFunction)

Subscription
- requestID: [requestorID(xAppID), xAppInstanceID] «generated»
- subscriptionManagerInstanceID: «generated»
- distributionList: distributionID[ ] «FK»
- xAppE2NodeRANFunctionMappingID: «FK»

FIG. 7 xApp RAN Functions and xApp RAN Parameters

| xAppRANParameter |
|---|
| • xAppRANParameterID:«generated» |
| • xAppRANFunctionName:«FK» |
| xAppRANParameterName |
| xAppRANParameterType |

| xAppRANFunction |
|---|
| • xAppRANFunctionName:[ ranFunctionShortName, ranFunctionE2SMOID, ranFunctionDescription, ranFunctionInstance]«PK» |
| xAppSubFunctionTypeList:xAppSubFunctionTypeID[] version |

| xAppRANSubFunction |
|---|
| • xAppSubFunctionTypeID:[]«PK»generated |
| • xAppRANFunctionName:[ ranFunctionShortName, ranFunctionE2SMOID, ranFunctionDescription, ranFunctionInstance]:«FK» |
| RICEventTriggerStyleList:[ricStyleType,ricStyleName,ricFormatTyp e] |
| RICReportStyleList:[ricReportStyleType,ricReportStyleName,ricRep ortActionFormatType,RANparameterIDList:xAppRANparameterID[ ],ricIndicationHeaderFormatType,ricIndicationMessageFormatType ] |
| RICInsertStyleList:[ricInsertStyleType,ricInsertStyleName,ricInsert ActionFormatType,RANparameterIDList:xAppRANparameterID[],ri cIndicationHeaderFormatType,ricIndicationMessageFormatType,ric CallProcessIDFormatType] |
| RICControlStyleList:[ricControlStyleType,ricControlStyleName,ricC ontrolFormatType,ricControlHeaderFormatType,ricControlMessage FormatType,ricCallProcessIDFormatType,ricControlOutcomeForma tType,RANparameterIDList:xAppRANparameterID[],] |
| RICPolicyStyleList:[ricPolicyStyleType,ricPolicyStyleName,ricPolicy ActionFormatType,RANparameterIDList:xAppRANparameterID[],] |

FIG. 8 xApp Deployment Data

| xAppPolicy |
|---|
| • xAppPolicyID: «generated» |
| • xAppID: «FK» |
| • xAppRANFunctionList:xAppRANFunctionName[] «FK» |
| policyObject |
| policyTypeObject |
| policyStatusObject |

| xAppRegistrationConfig |
|---|
| • xAppID: «generated» |
| • authorizedAPIList:APIType[] «FK» |
| • xAppRANFunctionList:xAppRANFunctionName[] «FK» |
| • xAppPolicyIDList:xAppPolicyID[] «FK» |
| • xAppEIJobIDList:xAppEIJobID[] «FK» |
| • SDLNotificationIDList:SDLNotificationID[] «FK» |
| xAppMessagingConfigID «FK» |
| probeList[] |
| metricList[] |
| containerList[] |
| name |
| vendor |
| version |

| xAppMessagingConfig |
|---|
| • xAppMessagingConfigID: «generated» |
| • xAppID: «FK» |
| hostname/IP |
| port |
| rxMessageList:messageType[] |
| txMessageList:messageType[] |

| xAppEI |
|---|
| • xAppEIJobID: «generated» |
| • xAppID: «FK» |
| eiTypeObject |
| eiJobObject |
| eiJobStatusObject |

| xAppAPIEnablementConfig |
|---|
| • APIType «generated» |
| • xAppID: «FK» |
| authorizationStatus |
| servingAreaInfo |
| protocols |
| Interfaces |

FIG. 9 — E2 Node RAN Function and E2 Node RAN Parameter Configuration

E2NodeRANParameter
- E2NodeRANParameterID:«generated»
- E2NodeRANFunctionName:«FK»

E2NodeRANParameterName
E2NodeRANParameterType

E2NodeRANFunction
- E2NodeRANFunctionName:[
ranFunctionShortName,
ranFunctionE2SMOID,
ranFunctionDescription,
ranFunctionInstance]«PK»

E2NodeSubFunctionTypeList:E2NodeSubFunctionTypeID[]
version

E2NodeRANSubFunction
- E2NodeSubFunctionTypeID:[]«PK»generated
- E2NodeRANFunctionName:[
ranFunctionShortName,
ranFunctionE2SMOID,
ranFunctionDescription,
ranFunctionInstance]:«FK»

RICEventTriggerStyleList:[ricStyleType,ricStyleName,ricFormatType]
RICReportStyleList:[ricReportStyleType,ricReportStyleName,ricReportActionFormatType,RANparameterIDList:E2NodeRANparameterID[],ricIndicationHeaderFormatType,ricIndicationMessageFormatType]
RICInsertStyleList:[ricInsertStyleType,ricInsertStyleName,ricInsertActionFormatType,RANparameterIDList:E2NodeRANparameterID[],ricIndicationHeaderFormatType,ricIndicationMessageFormatType,ricCallProcessIDFormatType]
RICControlStyleList:[ricControlStyleType,ricControlStyleName,ricControlHeaderFormatType,ricControlMessageFormatType,ricCallProcessIDFormatType,ricControlOutcomeFormatType,RANparameterIDList:E2NodeRANparameterID[],]
RICPolicyStyleList:[ricPolicyStyleType,ricPolicyStyleName,ricPolicyActionFormatType,RANparameterIDList:E2NodeRANparameterID[],]

STRUCTURE OF SYSTEM AND/OR DATA OF THE NEAR-RT RIC OF THE O-RAN

CROSS REFERENCE TO RELATED APPLICATIONS

This application is a National Stage of International Application No. PCT/JP2022/014031 filed Mar. 24, 2022, claiming priority based on Japanese Patent Application No. 2022-005950 filed Jan. 18, 2020.

BACKGROUND OF THE INVENTION

1. Field of the Invention

The present disclosure relates to structure of system and/or data of the Near-RT RIC of the O-RAN

2. Description of the Related Art

For the purpose of the so-called open radio access network (RAN) in a mobile communication system, "Open RAN", "O-RAN", "vRAN" etc. are being considered. In this specification, "O-RAN" is used as a comprehensive term for such various "open radio access networks". Therefore, the interpretation of "O-RAN" in this specification is not limited to the standard and/or the specification of the same name "O-RAN" specified by the O-RAN Alliance. In an O-RAN, a virtual infrastructure also referred to as O-Cloud that virtually manages a set of a plurality of radio access network nodes (RAN nodes) is provided.
Patent Literature 1: JP-A-2021-83058

SUMMARY OF THE INVENTION

A controller of the O-RAN comprises a Non-RT RIC (Non-Real Time RAN Intelligent Controller) and a Near-RT RIC (Near-Real Time RAN Intelligent Controller). The Non-RT RIC, which has a relatively long control cycle (e.g. 1 second or longer), executes application software called rApp. The Near-RT RIC, which has a relatively short control cycle (e.g. shorter than 1 second), executes application software called xApp. The Near-RT RIC not only collects a large amount of data from each RAN node (O-CU/O-DU) itself connected via the E2 interface and/or the radio unit (O-RU) connected to each of such RAN nodes, and/or from the Non-RT RIC connected via the A1 interface, but also is required to process the large amount of data within the short control cycle. Nevertheless, the structure of system and/or data of the Near-RT RIC has not been sufficiently defined.

The present disclosure was made in view of these circumstances, and its purpose is to provide a radio access network control apparatus and the like that comprises a Near-RT RIC whose structure is defined.

In order to solve the above problem, according to a radio access network control apparatus in a certain aspect of the present disclosure, a class related to the E2 node is correlated to a class related to the E2 node component configuration, in the Near-RT RIC (Near-Real Time RAN Intelligent Controller) of the O-RAN.

Another aspect of the present disclosure is also a radio access network control apparatus. According to the apparatus, a class related to the E2 node is correlated to a class related to the E2 node RAN function, in the Near-RT RIC (Near-Real Time RAN Intelligent Controller) of the O-RAN.

Further another aspect of the present disclosure is also a radio access network control apparatus. According to the apparatus, a class related to the xApp registration configuration is correlated to at least one of a class related to the xApp policy, a class related to the xApp messaging configuration, a class related to the xApp enrichment information, and a class related to the xApp API enablement configuration, in the Near-RT RIC (Near-Real Time RAN Intelligent Controller) of the O-RAN.

Further another aspect of the present disclosure is also a radio access network control apparatus. According to the apparatus, a class related to the xApp registration configuration is correlated to a class related to the xApp RAN function, in the Near-RT RIC (Near-Real Time RAN Intelligent Controller) of the O-RAN.

Further another aspect of the present disclosure is also a radio access network control apparatus. According to the apparatus, a class related to the xApp registration configuration is correlated to at least one of a class related to the xApp runtime A1 enrichment information mapping, a class related to the xApp runtime A1 policy mapping, and a class related to the xApp runtime E2 node RAN function mapping, in the Near-RT RIC (Near-Real Time RAN Intelligent Controller) of the O-RAN.

Further another aspect of the present disclosure is also a radio access network control apparatus. According to the apparatus, a class related to the subscription is correlated to a class related to the xApp runtime E2 node RAN function mapping, in the Near-RT RIC (Near-Real Time RAN Intelligent Controller) of the O-RAN.

In addition, any combination of the above components, and any conversion of the expression of the present disclosure among methods, devices, systems, recording media, computer programs and the like are also encompassed within this disclosure.

According to the present disclosure, a radio access network control apparatus and the like that comprises a Near-RT RIC whose structure is defined can be provided.

BRIEF DESCRIPTION OF THE DRAWINGS

FIG. 4 illustrates the classes included in the xApp runtime data, in the platform database.
FIG. 5 illustrates the classes included in the data received from the Non-RT RIC via the A1 interface, in the platform database.
FIG. 6 illustrates the classes included in the subscriptions/routing data, in the platform database.
FIG. 7 illustrates the classes included in the xApp RAN functions/xApp RAN parameters in the xApp deployment data, in the platform database.
FIG. 8 illustrates the other classes included in the xApp deployment data, in the platform database.
FIG. 9 illustrates the classes included in the E2 node RAN function/E2 node RAN parameter configuration of the R-NIB.

DETAILED DESCRIPTION OF THE INVENTION

In the following, the present embodiment is described in accordance with the "O-RAN" which is the standard and/or the specification developed by the O-RAN Alliance. Therefore, the known terms defined in "O-RAN" will be used in the present embodiment just for convenience, but the technologies according to this disclosure can be applied to other existing radio access networks such as "Open RAN" and "vRAN" and/or to similar radio access networks that may be developed in the future.

Figure 1:
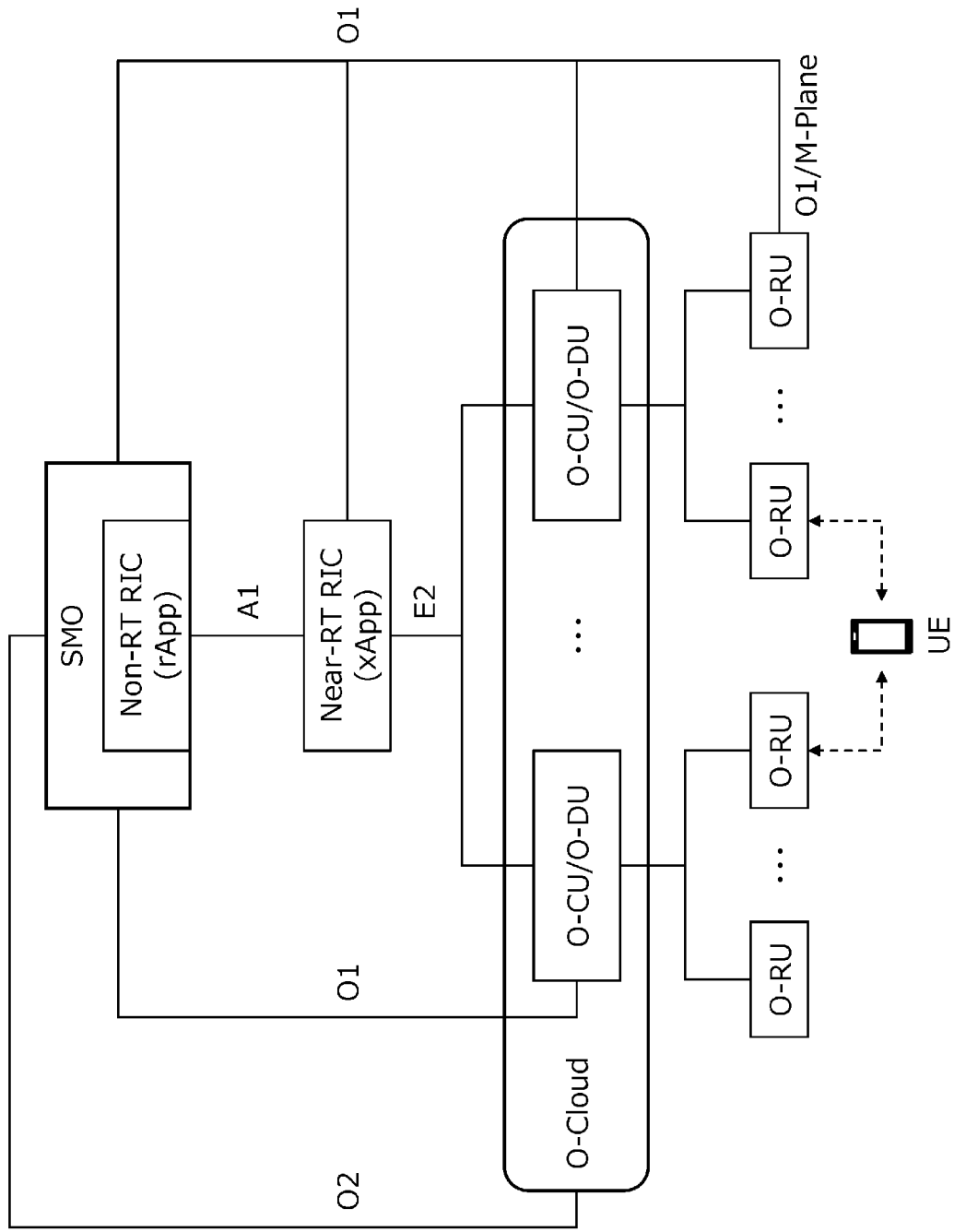
FIG. 1 is a schematic overview of a radio access network control apparatus.

FIG. 1 shows a schematic overview of the radio access network control apparatus according to the present embodiment. This radio access network control apparatus is a RAN control apparatus that controls radio access network in accordance with the O-RAN. The SMO (Service Management and Orchestration) controls the entire RAN control apparatus or the entire O-RAN and coordinates the operations of each portion. The SMO is equipped with a Non-RT RIC (Non-Real Time RAN Intelligent Controller) that functions as the overall control processor responsible for overall control. The Non-RT RIC, which has a relatively long control cycle (e.g. 1 second or longer), issues guidelines, policies, guidance etc. concerning the operation of each RAN node (O-CU and/or O-DU as described below). Specifically, the Non-RT RIC executes application software called rApp to issue operational policy for each RAN node to the Near-RT RIC (Near-Real Time RAN Intelligent Controller) through the A1 interface. The Near-RT RIC, which has a relatively short control cycle (e.g. shorter than 1 second), executes application software called xApp to control each RAN node (O-CU/O-DU) itself and/or general-purpose hardware etc. in the radio unit (O-RU) connected to each of the RAN nodes through the E2 interface.

The illustrated RAN node has an O-CU, which is an O-RAN compliant central unit (CU), and/or O-DU, which is an O-RAN compliant distributed unit (DU). Both of the O-CU and the O-DU are responsible for baseband processing in the O-RAN, where the O-CU is provided on the side of the core network (not shown in the figure), and the O-DU is provided on the side of the O-RU, which is an O-RAN compliant radio unit (RU). The O-CU may be divided into the O-CU-CP, which constitutes the control plane (CP), and the O-CU-UP, which constitutes the user plane (UP). The O-CU and the O-DU may be integrally configured as a single baseband processing unit. The O-eNB as a base station compliant with the O-RAN and the 4th generation mobile communication system (4G), may be provided as a RAN node. One or more O-RUs are connected to each RAN node (O-CU/O-DU) and are controlled by the Near-RT RIC via each of the RAN nodes. A communication device (UE: User Equipment) in the communication cell provided by each O-RU can be connected to each of the O-RUs, and can perform mobile communication with the core network (not shown) via each RAN node (O-CU/O-DU).

Each RAN node (O-CU/O-DU) and the Near-RT RIC provide operational data etc. of each RAN node, each O-RU and each UE through the O1 interface to the SMO for so-called FCAPS (Fault, Configuration, Accounting, Performance, Security). The SMO updates as necessary the operational policy for each RAN node issued by the Non-RT RIC to the Near-RT RIC through the A1 interface, based on the operational data acquired through the O1 interface. The O-RUs may be connected to the SMO for the FCAPS by the O1 interface and/or other interfaces (e.g. Open Fronthaul M-Plane).

The O-Cloud as a virtual infrastructure that virtually manages a set of the plurality of RAN nodes (O-CUs/O-DUs) is connected to the SMO by an O2 interface. The SMO generates a resource allocation policy concerning the resource allocation and/or a workload management policy concerning the workload management of the plurality of RAN nodes, based on the operational states of the plurality of RAN nodes (O-CUs/O-DUs) acquired from the O-Cloud through the O2 interface, and issues them to the O-Cloud through the O2 interface.

Figure 2:
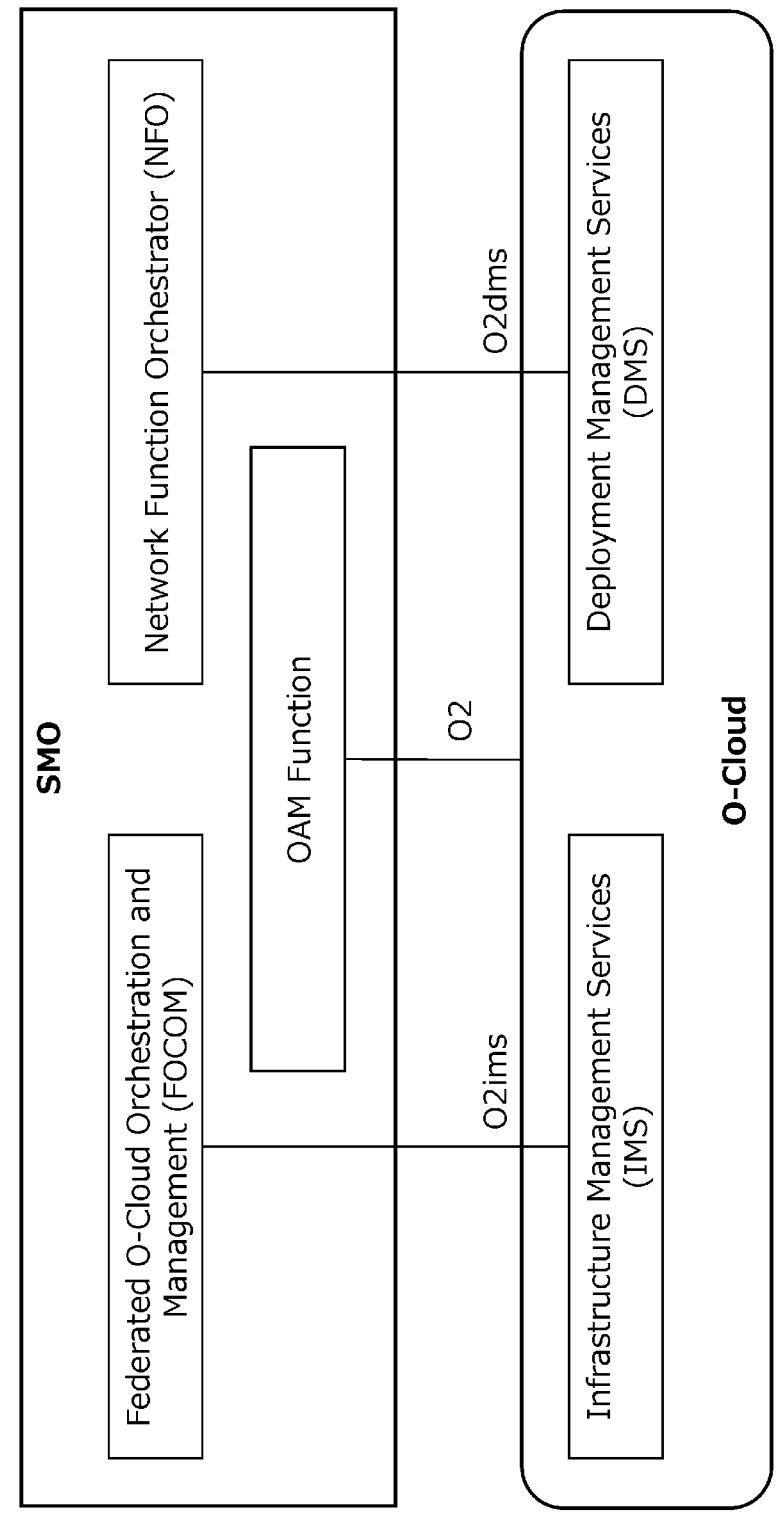
FIG. 2 schematically shows various functions realized in the SMO and/or the Non-RT RIC and O-Cloud.

FIG. 2 schematically shows the various functions realized in the SMO and/or the Non-RT RIC and the O-Cloud. In the SMO, three main functions are realized, which are the FOCOM (Federated O-Cloud Orchestration and Management), the NFO (Network Function Orchestrator) and the OAM Function. In the O-Cloud, two main functions are realized, which are the IMS (Infrastructure Management Services) and the DMS (Deployment Management Services).

The FOCOM manages resources in the O-Cloud, while receiving services from the IMS of the O-Cloud through the O2 interface (O2 ims). The NFO realizes the orchestrated operation of a set of network functions (NFs) by a plurality of NF Deployments in the O-Cloud, while receiving services from the DMS of the O-Cloud through the O2 interface (O2 dms). The NFO may utilize the OAM Function to access the deployed NFs through the O1 interface. The OAM Function is responsible for the FCAPS management of O-RAN managed entities such as the RAN nodes. The OAM Function in the present embodiment can be a functional block where callbacks are provided for receiving data concerning failures and/or operational states of the plurality of RAN nodes that are virtually managed by the O-Cloud, by monitoring processes or procedures over the O2 ims and/or the O2 dms. The IMS is responsible for managing the O-Cloud resources (hardware) and/or the software used for managing them, and provides services primarily to the FOCOM of the SMO. The DMS is responsible for the management of the plurality of NF Deployments in the O-Cloud, specifically the initiation, monitoring, termination etc., and provides services primarily to the NFO of the SMO.

Figure 3:
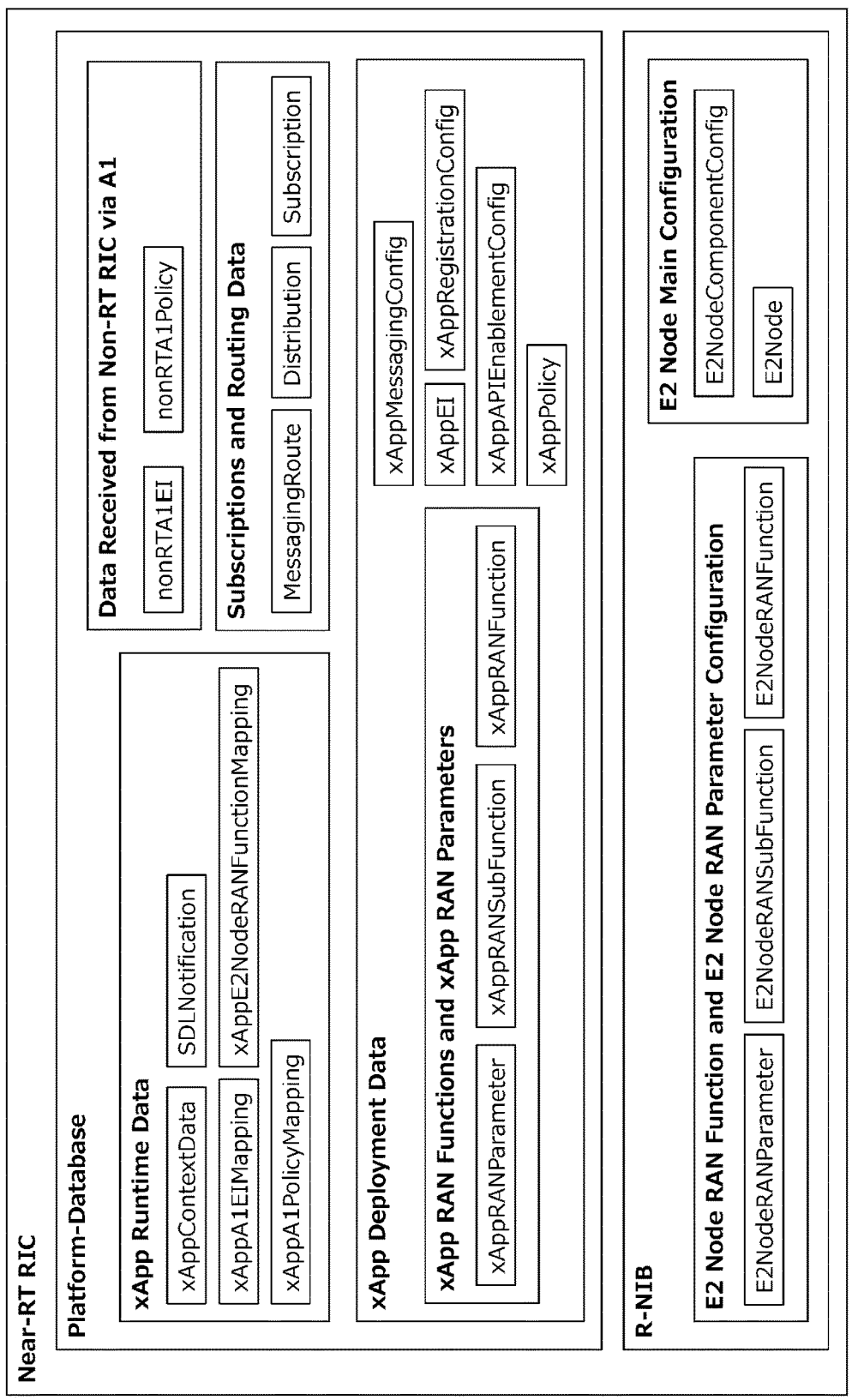
FIG. 3 is a schematic representation of the structure of system and/or data of the Near-RT RIC.

FIG. 3 is a schematic representation of the structure of system and/or data of the Near-RT RIC. The Near-RT RIC in the illustrated example has a database or a platform database (Platform Database) and a R-NIB (Radio-Network Information Base). The Platform Database handles xApp Runtime Data, xApp Deployment Data, Data Received from Non-RT RIC via A1 (interface), and Subscriptions and Routing Data. The R-NIB handles E2 Node RAN Function and E2 Node RAN Parameter Configuration and E2 Node Main Configuration.

In the following, the configurations and/or processes of each part of the Near-RT RIC in FIG. 3 will be described in detail using the concept of a class diagram in the unified modeling language (UML). However, it should be noted that technological concept according to the present disclosure can be applied to system and/or data described by any modeling languages and/or expressions other than UML. As is well known in UML, each rectangular class shown in a class diagram has at most three lines: class name, attribute (field) and class operation (method). In the following examples, "generated" shown in attribute and/or class operation indicates that the data is generated by this class, "PK" indicates a primary key constraint, and "FK" indicates a foreign key constraint.

FIG. 4 illustrates the classes included in the xApp Runtime Data, in the platform database. A class related to the xApp runtime context data has "xAppContextData" as a class name, "•xAppContextDataID:«generated»" as an attribute, and "•xAppID:«FK»", "•xAppContextData" as class operations. A class related to the xApp runtime A1-EI (A1 Enrichment Information) mapping has "xAppA1EIMapping" as a class name, "•xAppA1EIMapping:«generated»" as an attribute, and "•xAppEIJobID:«FK»", "•xAppID:«FK»", "•eiJobID:«FK»" as class operations. A class related to the xApp runtime A1 policy mapping has "xAppA1PolicyMapping" as a class name, "•xAppA1PolicyMapping:«generated»" as an attribute, and "•xAppPolicyID:«FK»", "•xAppID:«FK»", "•policyID:«FK»" as class operations. A class related to the xApp runtime SDL (Shared Data Layer) notification has "SDLNotification" as a class name, "•SDLNotificationID:«generated»" as an attribute, and "•xAppID:«FK»", "•E2NodeId:«FK»" as class operations. A class related to the xApp runtime E2 node RAN function mapping has "xAppE2NodeRANFunctionMapping" as a class name, "•xAppE2NodeRANFunctionMappingID:«generated»", "•xAppRANFunctioninstanceID:«generated»" as attributes, and "•xAppID:«FK»", "E2NodeID:«FK»", "•xAppRANFunctionName:«FK»", "•E2NodeRANFunctionName:«FK»" as class operations. Each class included in these xApp runtime data is described by UML as follows.

```
xAppE2NodeRANFunctionMapping:$xAppE2NodeRANFunctionMappingID:$xAppRANFunctionInstanceID:$xAppID
xAppE2NodeRANFunctionMapping:$xAppE2NodeRANFunctionMappingID:$xAppRANFunctionInstanceID:$E2NodeID
xAppE2NodeRANFunctionMapping:$xAppE2NodeRANFunctionMappingID:$xAppRANFunctionInstanceID:$xAppRANFunctionName
xAppE2NodeRANFunctionMapping:$xAppE2NodeRANFunctionMappingID:$xAppRANFunctionInstanceID:$E2NodeRANFunctionName
xAppA1PolicyMapping:$xAppA1PolicyMappinID:$xAppPolicyID:$xAppID
xAppA1PolicyMapping:$xAppA1PolicyMappinID:$xAppPolicyID:$policyID
xAppA1EIMapping:$xAppA1EIMappingID:$xAppEIJobID:$xAppID
xAppA1EIMapping:$xAppA1EIMappingID:$xAppEIJobID:$eiJobID
xAppContextData:$xAppContextDataID:$xAppID
xAppContextData:$xAppContextDataID:$xAppContextData
SDLNotification:$SDLNotificationID:$xAppID
SDLNotification:$SDLNotificationID:$E2NodeId
```

FIG. 5 illustrates the classes included in the Data Received from Non-RT RIC via A1 (Interface), in the platform database. A class related to the A1-EI (A1 Enrichment Information) received from Non-RT RIC has "nonRTA1EI" as a class name, "•eiJobID:«generated»" as an attribute, and "eiTypeID", "eiTypeObject", "eiJobObject", "eiJobStatusObject" as class operations. A class related to the A1 policy received from Non-RT RIC has "nonRTA1Policy" as a class name, "•policyID:«generated»" as an attribute, and "policyTypeID", "policyObject", "policyTypeObject", "policyStatusObject" as class operations. Each class included in these data received from Non-RT RIC via A1 (interface) is described by UML as follows.

```
nonRTA1Policy:$policyID:$policyTypeID
nonRTA1Policy:$policyID:$policyObject
nonRTA1Policy:$policyID:$policyTypeObject
nonRTA1Policy:$policyID:$policyStatusObject
nonRTA1EI:$eiJobID:$eiTypeID
nonRTA1EI:$eiJobID:$eiTypeObject
nonRTA1EI:$eiJobID:$eiJobObject
nonRTA1EI:$eiJobID:$eiJobStatusObject
```

FIG. 6 illustrates the classes included in the Subscriptions and Routing Data, in the platform database. A class related to the messaging route has "MessagingRoute" as a class name, "•messagingRouteID:«generated»", "•requestID:«FK»", "•distributionID:«FK»", "messageType" as attributes, and "senderEndPoint(hostname/IP.port-InstanceID)", "receiverEndPoint(hostname/IP.port-InstanceID=" as class operations. A class related to the distribution has "Distribution" as a class name, "•distributionID:«generated»", "•requestID:«FK»" as attributes, and "xAppInstanceID", "E2TerminationInstanceID", "eventTrigger: (from RANSubFunction)", "actionID: (from RANSubFunction)" as class operations. A class related to the subscription has "Subscription" as a class name, "•requestID: [requestorID (xAppID),xAppInstanceID]«generated»", "•subscriptionManagerInstanceID:«generated»" as attributes, and "•distributionList:distributionID[ ]«FK»", "•xAppE2NodeRANFunctionMappingID:«FK»" as class operations. Each class included in these subscriptions and routing data is described by UML as follows.

```
Subscription:$requestID:[requestorID(xAppID),
xAppInstanceID]:$subscriptionManagerInstanceID:$distributionList:$distributionID[ ]
Subscription:$requestID:[requestorID(xAppID),
xAppInstanceID]:$subscriptionManagerInstanceID:$xAppE2NodeRAN
```

-continued

```
FunctionMappingID
Distribution:$distributionID:$requestID:$xAppInstanceID
Distribution:$distributionID:$requestID:$E2TerminationInstanceID
Distribution:$distributionID:$requestID:$eventTrigger(from
RANSubFunction)
Distribution:$distributionID:$requestID:$actionID(from
RANSubFunction)
```

MessagingRoute:$messagingRouteID:$messageType:$requestID:$dis    tributionID:$senderEndPoint(hostname/IP- .port—InstanceID) MessagingRoute:$messagingRouteID: $messageType:$requestID:$dis tributionID:$receiverEndPoint(hostname/IP.port—InstanceID)

FIG. 7 illustrates the classes included in the xApp RAN Functions and xApp RAN Parameters in the xApp Deployment Data, in the platform database. A class related to the xApp RAN parameter has "xAppRANParameter" as a class name, "•xAppRANParameterID:«generated»", "•xAppRANFunctionName:«FK»" as attributes, and "xAppRANParameterName", "xAppRANParameterType" as class operations. A class related to the xApp RAN function has "xAppRANFunction" as a class name, "•xAppRANFunctionName:[ranFunctionShortName,ranFunctionE2SMOID, ranFunctionDescription,ranFunctionInstance]«PK»" as an attribute, and "xAppSubFunctionTypeList:xAppSubFunctionTypeID[ ]", "version" as class operations. A class related to the xApp RAN sub-function has "xAppRANSubFunction" as a class name, "•xAppSubFunctionTypeID:[ ]«PK-»generated", "•xAppRANFunctionName:[ranFunctionShortName,ranFunctionE2SMOID, ranFunctionDescription,ranFunctionInstance]:«FK»" as attributes, and "RICEventTriggerStyleList:[ricStyleType,ricStyleName,ricForma tType]", "RICReportStyleList:[ricReportStyleType,ricReportStyleName,ri cReportActionFormatType,RANparameterIDList:xAppRANparameterID [ ],ricIndicationHeaderFormatType,ricIndicationMessageFormatTy pe]", "RICInsertStyleList:[ricInsertStyleType, ricInsertStyleName,ri cInsertActionFormatType,RANparameterIDList:xAppRANparameterID [ ],ricIndicationHeaderFormatType,ricIndicationMessageFormatTy pe, ricCallProcessIDFormatType]", "RICControlStyleList: [ricControlStyleType, ricControlStyleName, ricControlFormatType,ricControlHeaderFormatType,ricControlMe ssageFormatType,ricCallProcessIDFormatType,ricControlOutcomeF ormatType,RANparameterIDList:xAppRANparameterID[ ],]", "RICPolicyStyleList: [ricPolicyStyleType, ricPolicyStyleName,ri cPolicyActionFormatType, RANparameterIDList:xAppRANparameterID [ ],]" as class operations. Each class included in these xApp RAN functions and xApp RAN parameters is described by UML as follows.

```
xAppRANFunction:$xAppRANFunctionName: [$ranFunctionShortName,
$ranFunctionE2SMOID,
$ranFunctionDescription, $ranFunctionInstance ]:
$xAppSubFunctionTypeList:$xAppSubFunctionTypeID
xAppRANFunction:$xAppRANFunctionName: [$ranFunctionShortName,
$ranFunctionE2SMOID,
$ranFunctionDescription, $ranFunctionInstance ]:$version
xAppRANSubFunction:$xAppRANFunctionName:
[$ranFunctionShortName, $ranFunctionE2SMOID,
$ranFunctionDescription, $ranFunctionInstance
]:$xAppSubFunctionTypeID:$RICEventTriggerStyleList:[$ricStyle
Type,$ricStyleName, ricFormatType]
xAppRANSubFunction:$xAppRANFunctionName:
[$ranFunctionShortName, $ranFunctionE2SMOID,
$ranFunctionDescription,
$ranFunctionInstance ]:$xAppSubFunctionTypeID:$RICReportStyle
List
:[$ricReportStyleType,$ricReportStyleName,
$ricReportActionFormatType,$RANparameterIDList
:$xAppRANparameterID[ ], $ricIndicationHeaderFormatType,
$ricIndicationMessageFormatType]
xAppRANSubFunction:$xAppRANFunctionName:
[$ranFunctionShortName, $ranFunctionE2SMOID,
$ranFunctionDescription,
$ranFunctionInstance]:$xAppSubFunctionTypeID:$RICInsertStyleL
ist : [$ricInsertStyleType,
$ricInsertStyleName,
$ricInsertActionFormatType,$RANparameterIDList :
$xAppRANparameterID [ ]],
$ricIndicationHeaderFormatType,
$ricIndicationMessageFormatType, $ricCallProcessIDFormatType]
xAppRANSubFunction:$xAppRANFunctionName:
[$ranFunctionShortName, $ranFunctionE2SMOID,
$ranFunctionDescription,
$ranFunctionInstance]:$xAppSubFunctionTypeID:$RICControlStyle
List :
[$ricControlStyleType,$ricControlStyleName,$ricControlFormatT
ype, $ricControlHeaderFormatType,
$ricControlMessageFormatType,$ricCallProcessIDFormatType,
$ricControlOutcomeFormatType,$RANparameterIDList :
$xAppRANparameterID [ ], ]
xAppRANSubFunction:$xAppRANFunctionName:
[$ranFunctionShortName, $ranFunctionE2SMOID,
$ranFunctionDescription,
$ranFunctionInstance]:$xAppSubFunctionTypeID:$RICPolicyStyleL
ist : [$ricPolicyStyleType,
$ricPolicyStyleName, $ricPolicyActionFormatType,
$RANparameterIDList : $xAppRANparameterID [ ],]
xAppRANParameter:$xAppRANFunctionName: [$ranFunctionShortName,
$ranFunctionE2SMOID,
$ranFunctionDescription,
$ranFunctionInstance]:$xAppRANParameterID:$xAppRANParameterNa
me
```

```
xAppRANParameter:$xAppRANFunctionName: [$ranFunctionShortName,
$ranFunctionE2SMOID,
$ranFunctionDescription,
$ranFunctionInstance]:$xAppRANParameterID:$xAppRANParameterTy
pe
```

FIG. 8 illustrates the other classes included in the xApp Deployment Data, in the platform database. A class related to the xApp policy has "xAppPolicy" as a class name, "•xAppPolicyID:«generated»", "•xAppID:«FK»" as attributes, and "•xAppRANFunctionList:xAppRANFunctionName[ ]«FK»", "policyObject", "policyTypeObject", "policyStatusObject" as class operations. A class related to the xApp registration configuration has "xAppRegistrationConfig" as a class name, "•xAppID:«generated»" as an attribute, and "•authorizedAPIList:APIType[ ]«FK»", "•xAppRANFunctionList:xAppRANFunctionName[ ]«FK»", "•xAppPolicyIDList:xAppPolicyID[ ]«FK»", "•xAppEIJobIDList: xAppEIJobID[ ]«FK»", "•SDLNotificationIDList: SDLNotificationID[ ]«FK»", "xAppMessagingConfigID «FK»", "probeList[ ]", "metricList[ ]", "containerList[ ]", "name", "vendor", "version" as class operations. A class related to the xApp messaging configuration has "xAppMessagingConfig" as a class name, "•xAppMessagingConfigID-«generated»", "•xAppID:«FK»" as attributes, and "hostname/IP", "port", "rxMessageList:messageType[ ]", "txMessageList:messageType[ ]" as class operations. A class related to the xApp EI (Enrichment Information) has "xAppEI" as a class name, "•xAppEIJpbID:«generated»", "•xAppID:«FK»" as attributes, and "eiTypeObject", "eiJobObject", "eiJobStatusObject" as class operations. A class related to the xApp API enablement configuration has "xAppAPIEnablementConfig" as a class name, "•APIType«generated»", "•xAppID:«FK»" as attributes, and "authorizationStatus", "servingAreaInfo", "protocols", "Interfaces" as class operations. Each class included in these xApp deployment data is described by UML as follows.

```
xAppRegistrationConfig:$xAppID:$authorizedAPIList:$APIType[ ]
xAppRegistrationConfig:$xAppID:$xAppRANFunctionList:$xAppRANF
unctionName[ ]
xAppRegistrationConfig:$xAppID:$xAppPolicyIDList:$xAppPolicyI
D[ ]
xAppRegistrationConfig:$xAppID:$xAppEIJobIDList:$xAppEIJobID[
]
xAppRegistrationConfig:$xAppID:$SDLNotificationIDList:$SDLNot
ificationID[ ]
xAppRegistrationConfig:$xAppID:$xAppMessagingConfigID
xAppRegistrationConfig:$xAppID:$probeList[ ]
xAppRegistrationConfig:$xAppID:$metricList[ ]
xAppRegistrationConfig:$xAppID:$containerList[ ]
xAppRegistrationConfig:$xAppID:$name
xAppRegistrationConfig:$xAppID:$vendor
xAppRegistrationConfig:$xAppID:$version
xAppAPIEnablementConfig:$APIType:$xAppID:$authorizationStatus
xAppAPIEnablementConfig:$APIType:$xAppID:$servingAreaInfo
xAppAPIEnablementConfig:$APIType:$xAppID:$protocols
xAppAPIEnablementConfig:$APIType:$xAppID:$interfaces
xAppMessagingConfig:$xAppMessagingConfigID:$xAppID:$hostname/
IP
xAppMessagingConfig:$xAppMessagingConfigID:$xAppID:$port
xAppMessagingConfig:$xAppMessagingConfigID:$xAppID:$rxMessage
List:messageType[ ]
xAppMessagingConfig:$xAppMessagingConfigID:$xAppID:$txMessage
List:messageType[ ]
xAppPolicy:$xAppPolicyID:$xAppID:$xAppRANFunctionList:$xAppRA
NFunctionName[ ]
xAppPolicy:$xAppPolicyID:$xAppID:$policyObject
xAppPolicy:$xAppPolicyID:$xAppID:$policyTypeObject
xAppPolicy:$xAppPolicyID:$xAppID:$policyStatusObject
xAppEI:$xAppEIJobID:$xAppID:$eiTypeObject
```

```
xAppEI:$xAppEIJobID:$xAppID:$eiJobObject
xAppEI:$xAppEIJobID:$xAppID:$eiJobStatusObject
```

FIG. 9 illustrates the classes included in the E2 Node RAN Function and E2 Node RAN Parameter Configuration of the R-NIB. A class related to the E2 node RAN parameter has "E2NodeRANParameter" as a class name, "•E2NodeRANParameterID:«generated»", "•E2NodeRANFunctionName:«FK»" as attributes, and "E2NodeRANParameterName", "E2NodeRANParameterType" as class operations. A class related to the E2 node RAN function has "E2NodeRANFunction" as a class name, "•E2NodeRANFunctionName:[ranFunctionShortName, ranFunctionE2SMOI D,ranFunctionDescription,ranFunctionInstance]«PK»" as an attribute, and "E2NodeSubFunctionTypeList:E2NodeSubFunctionTypeID[ ]", "version" as class operations. A class related to the E2 node RAN sub-function has "E2NodeRANSubFunction" as a class name, "•E2NodeSubFunctionTypeID:[ ]«PK»generated", "•E2NodeRANFunctionName:[ranFunctionShortName, ranFunctionE2SMOI D,ranFunctionDescription,ranFunctionInstance]:«FK»" as attributes, and "RICEventTriggerStyleList:[ricStyleType,ricStyleName,ricForma tType]", "RICReportStyleList:[ricReportStyleType,ricReportStyleName,ri cReportActionFormatType,RANparameterIDList: E2NodeRANparameter ID[ ],ricIndicationHeaderFormatType,ricIndicationMessageFormat Type]", "RICInsertStyleList:[ricInsertStyleType,ricInsertStyleName,ri cInsertActionFormatType,RANparameterIDList:E2NodeRANparameter ID[ ],ricIndicationHeaderFormatType,ricIndicationMessageFormat Type,ricCallProcessIDFormatType]", "RICControlStyleList:[ricControlStyleType,ricControlStyleName, ricControlFormatType,ricControlHeaderFormatType,ricControlMe ssageFormatType,ricCallProcessIDFormatType,ricControlOutcomeF ormatType,RANparameterIDList:E2NodeRANparameterID[ ],]", "RICPolicyStyleList:[ricPolicyStyleType,ricPolicyStyleName,ri cPolicyActionFormatType,RANparameterIDList: E2NodeRANparameter ID[ ],]" as class operations. Each class included in these E2 node RAN function and E2 node RAN parameter configuration is described by UML as follows.

```
E2NodeRANFunction:$E2NodeRANFunctionName:
[$ranFunctionShortName, $ranFunctionE2SMOID,
$ranFunctionDescription, $ranFunctionInstance ]:
$E2NodeSubFunctionTypeList:$E2NodeSubFunctionTypeID
E2NodeRANFunction:$E2NodeRANFunctionName:
[$ranFunctionShortName, $ranFunctionE2SMOID,
$ranFunctionDescription, $ranFunctionInstance ]:$version
E2NodeRANSubFunction:$E2NodeRANFunctionName:
[$ranFunctionShortName, $ranFunctionE2SMOID,
$ranFunctionDescription, $ranFunctionInstance
]:$E2NodeSubFunctionTypeID:$RICEventTriggerStyleList:[$ricSty
leType,$ricStyleName, ricFormatType]
E2NodeRANSubFunction:$E2NodeRANFunctionName:
[$ranFunctionShortName, $ranFunctionE2SMOID,
$ranFunctionDescription,
```

```
$ranFunctionInstance ]:$E2NodeSubFunctionTypeID:$RICReportSty
leList
:[$ricReportStyleType,$ricReportStyleName,
$ricReportActionFormatType,$RANparameterIDList
:$E2NodeRANparameterID[ ], $ricIndicationHeaderFormatType,
$ricIndicationMessageFormatType]
E2NodeRANSubFunction:$E2NodeRANFunctionName:
[$ranFunctionShortName, $ranFunctionE2SMOID,
$ranFunctionDescription,
$ranFunctionInstance]:$E2NodeSubFunctionTypeID:$RICInsertStyl
eList : [$ricInsertStyleType,
$ricInsertStyleName,
$ricInsertActionFormatType,$RANparameterIDList :
$E2NodeRANparameterID [ ]],
$ricIndicationHeaderFormatType,
$ricIndicationMessageFormatType, $ricCallProcessIDFormatType]
E2NodeRANSubFunction:$E2NodeRANFunctionName:
[$ranFunctionShortName, $ranFunctionE2SMOID,
$ranFunctionDescription,
$ranFunctionInstance]:$E2NodeSubFunctionTypeID:$RICControlSty
leList :
[$ricControlStyleType,$ricControlStyleName,$ricControlFormatT
ype, $ricControlHeaderFormatType,
$ricControlMessageFormatType,$ricCallProcessIDFormatType,
$ricControlOutcomeFormatType,$RANparameterIDList :
$E2NodeRANparameterID [ ], ]
E2NodeRANSubFunction:$E2NodeRANFunctionName:
[$ranFunctionShortName, $ranFunctionE2SMOID,
$ranFunctionDescription,
```

```
$ranFunctionInstance]:$E2NodeSubFunctionTypeID:$RICPolicyStyl
eList : [$ricPolicyStyleType,
$ricPolicyStyleName, $ricPolicyActionFormatType,
$RANparameterIDList : $E2NodeRANparameterID[ ],]
E2NodeRANParameter:$E2NodeRANFunctionName:
[$ranFunctionShortName, $ranFunctionE2SMOID,
$ranFunctionDescription,
$ranFunctionInstance]:$E2NodeRANParameterID:$E2NodeRANParamet
erName
E2NodeRANParameter:$E2NodeRANFunctionName:
[$ranFunctionShortName, $ranFunctionE2SMOID,
$ranFunctionDescription,
$ranFunctionInstance]:$E2NodeRANParameterID:$E2NodeRANParamet
erType
```

Figure 10:
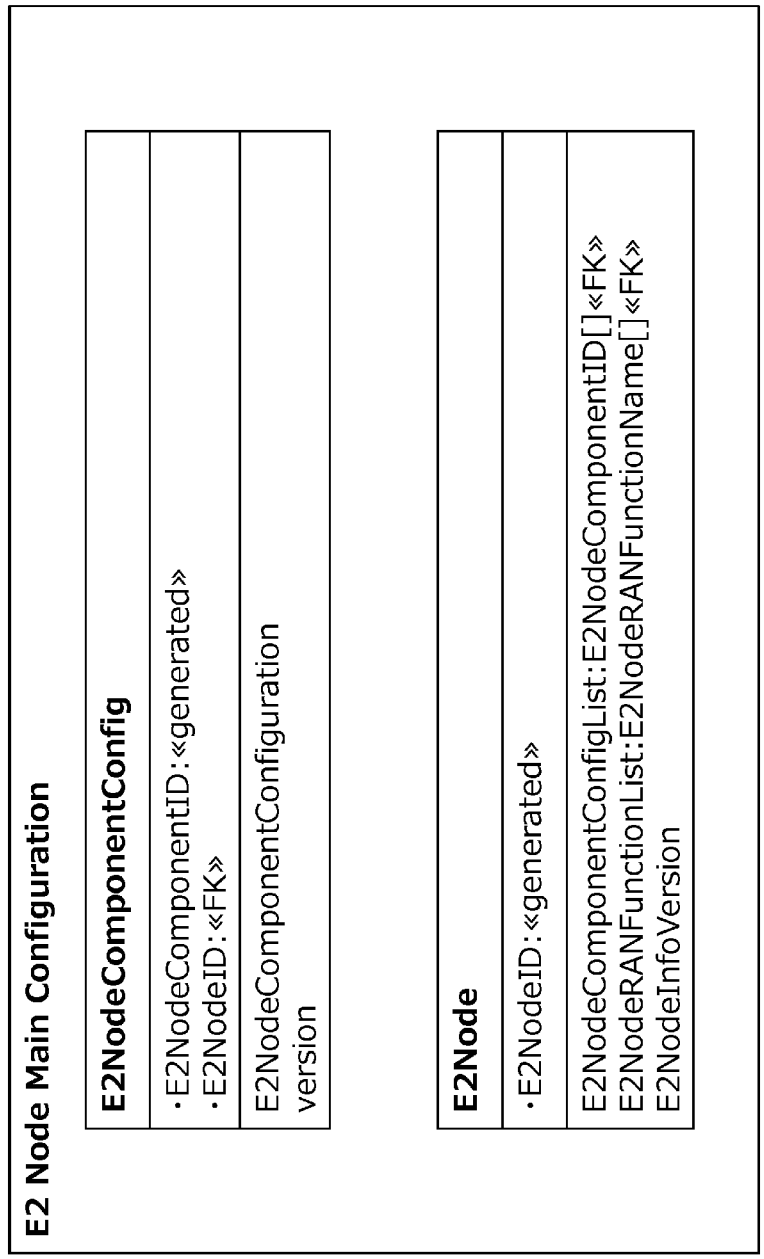
FIG. 10 illustrates the classes included in the E2 node main configuration of the R-NIB.

FIG. 10 illustrates the classes included in the E2 Node Main Configuration of the R-NIB. A class related to the E2 node component configuration has "E2NodeComponentConfig" as a class name, "•E2NodeComponentID:«generated»", "•E2NodeID:«FK»" as attributes, and "E2NodeComponentConfiguration", "version" as class operations. A class related to the E2 node has "E2Node" as a class name, "•E2NodeID:«generated»" as an attribute, and "E2NodeComponentConfigList:E2NodeComponentID[ ]«FK»", "E2NodeRANFunction-List:E2NodeRANFunctionName[ ]«FK»", "E2NodeInfoVersion" as class operations. Each class included in these E2 node main configuration is described by UML as follows.

```
E2Node:$E2NodeID:$E2NodeComponentConfigList:$E2NodeComponentI
D[ ]
E2Node:$E2NodeID:$E2NodeRANFunctionList:$E2NodeRANFunctionNam
e[ ]
E2Node:$E2NodeID:$E2NodeInfoVersion
E2NodeComponentConfig:$E2NodeComponentID:$E2NodeComponentConf
iguration
E2NodeComponentConfig:$E2NodeComponentID:$Version
```

In the following, the relationship between the classes included in the platform database (xApp runtime data, xApp deployment data, data received from Non-RT RIC via A1 interface, subscriptions/routing data etc.) and the R-NIB (E2 node RAN function/E2 node RAN parameter configuration, E2 node main configuration) will be described in detail using the concept of the class diagram in UML. In a general class diagram, defined types of relationship between classes include association, aggregation, composition, dependency, generalization, specialization, realization, implementation etc. In the present embodiment, appropriate type of relationship is set between each of the correlated classes in accordance with contexts, UML examples, and expressions in each figure.

Figure 11:
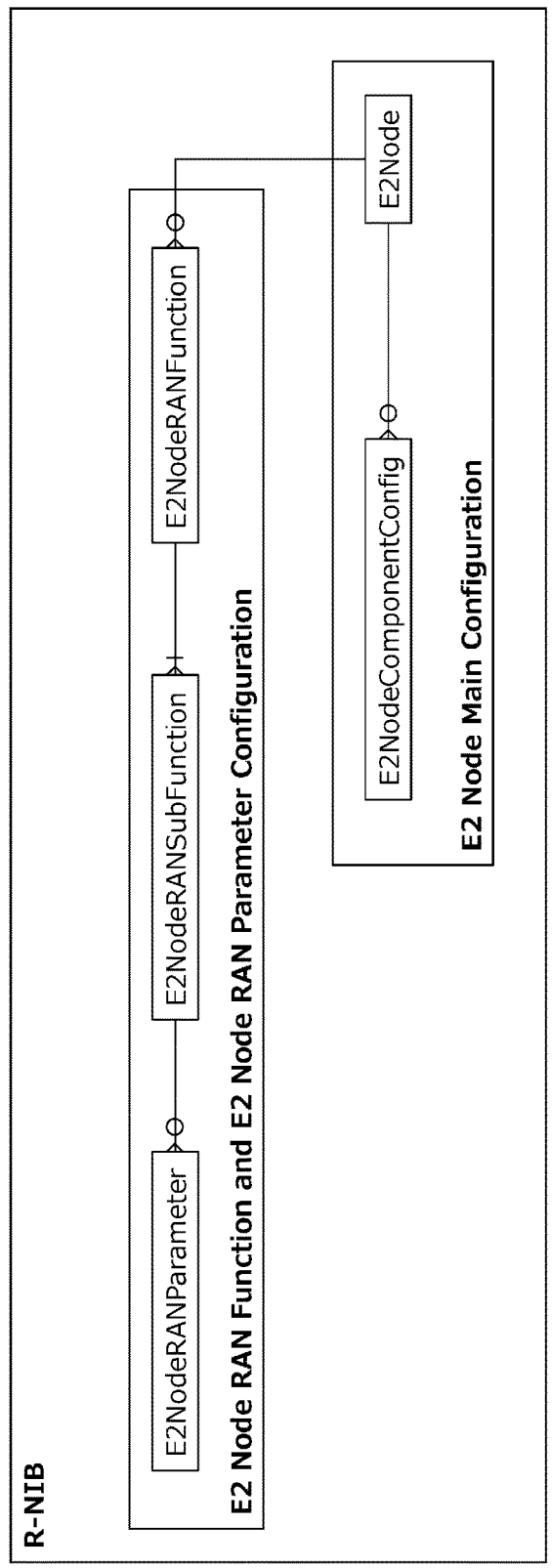
FIG. 11 schematically shows an example of the relationship between classes in the R-NIB.

FIG. 11 schematically shows an example of the relationship between classes in the R-NIB.

The following description correlates the class "E2Node" in the E2 Node Main Configuration (FIG. 10) to the class "E2NodeComponentConfig". Specifically, the attribute "E2NodeID" in the class "E2Node" is correlated, via the class operation "E2NodeComponentConfigList:E2NodeComponentID[ ]", to the attribute "E2NodeComponentID" and the class operations "E2NodeComponentConfiguration", "version" in the class "E2NodeComponentConfig".

```
E2Node:$E2NodeID:$E2NodeComponentConfigList:$E2NodeComponentI
D:$E2NodeComponentConfiguration
E2Node:$E2NodeID:$E2NodeComponentConfigList:$E2NodeComponentI
D:$version
```

The following description correlates the class "E2Node" in the E2 Node Main Configuration (FIG. 10) to the classes "E2NodeRANFunction", "E2NodeRANSubFunction", "E2NodeRANParameter" in the E2 Node RAN Function and E2 Node RAN Parameter Configuration (FIG. 9). As shown in FIG. 11, the class "E2Node" is correlated to the class "E2NodeRANFunction", the class "E2NodeRANFunction" is correlated to the class "E2NodeRANSubFunction", and the class "E2NodeRANSubFunction" is correlated to the class "E2NodeRANParameter".

The following description correlates the attribute "E2NodeID" in the class "E2Node", via the class operation "E2NodeRANFunctionList:E2NodeRANFunctionName [ ]", to the attribute "E2NodeRANFunctionName:[ranFunctionShortName,ranFunctionE2SMO ID,ranFunctionDescription,ranFunctionInstance]" and the class operations "E2NodeSubFunctionTypeList:
E2NodeSubFunctionTypeID[ ]", "version" in the class "E2NodeRANFunction".

E2NodeSubFunctionTypeID[ ]" in the class "E2NodeRANFunction". Furthermore, this class operation "E2NodeSubFunctionTypeList:
E2NodeSubFunctionTypeID[ ]" is correlated to the attribute "E2NodeSubFunctionTypeID" and the class operations

---

"RICEventTriggerStyleList:[ricStyleType,ricStyleName,ricFormatType]",
"RICReportStyleList:[ricReportStyleType,ricReportStyleName,ricReportActionFormatType,RANparameterIDList:E2NodeRANparameterID[ ],ricIndicationHeaderFormatType,ricIndicationMessageFormatType]",
"RICInsertStyleList:[ricInsertStyleType,ricInsertStyleName,ricInsertActionFormatType,RANparameterIDList:E2NodeRANparameterID[ ],ricIndicationHeaderFormatType,ricIndicationMessageFormatType,ricCallProcessIDFormatType]",
"RICControlStyleList:[ricControlStyleType,ricControlStyleName,ricControlFormatType,ricControlHeaderFormatType,ricControlMessageFormatType,ricCallProcessIDFormatType,ricControlOutcomeFormatType,RANparameterIDList:E2NodeRANparameterID[ ],]",

---

E2Node:$E2NodeID:$E2NodeRANFunctionList:$E2NodeRANFunctionName: [$ranFunctionShortName,
$ranFunctionE2SMOID, $ranFunctionDescription,
$ranFunctionInstance
]:$E2NodeSubFunctionTypeList:$E2NodeSubFunctionTypeID[ ]
E2Node:$E2NodeID:$E2NodeRANFunctionList:$E2NodeRANFunctionName: [$ranFunctionShortName,
$ranFunctionE2SMOID, $ranFunctionDescription,
$ranFunctionInstance ]:$version

---

The following description correlates the attribute "E2NodeID" in the class "E2Node", via the class operation "E2NodeRANFunctionList:E2NodeRANFunctionName[ ]", to the attribute "E2NodeRANFunctionName:[ranFunctionShortName,ranFunctionE2SMO ID,ranFunctionDescription,ranFunctionInstance]" and the class operation "E2NodeSubFunctionTypeList:

-continued

"RICPolicyStyleList:[ricPolicyStyleType,ricPolicyStyleName,ricPolicyActionFormatType,RANparameterIDList:E2NodeRANparameterID[ ],]" in the class "E2NodeRANSubFunction".

---

E2Node:$E2NodeID:$E2NodeRANFunctionList:$E2NodeRANFunctionName: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICEventTriggerStyleList:[$ricStyleType,$ricStyleName,
ricFormatType]
E2Node:$E2NodeID:$E2NodeRANFunctionList:$E2NodeRANFunctionName: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICReportStyleList
:[$ricReportStyleType,$ricReportStyleName,
$ricReportActionFormatType,$RANparameterIDList
:$E2NodeRANparameterID[ ], $ricIndicationHeaderFormatType,
$ricIndicationMessageFormatType]
E2Node:$E2NodeID:$E2NodeRANFunctionList:$E2NodeRANFunctionName: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICInsertStyleList : [$ricInsertStyleType,
$ricInsertStyleName,
$ricInsertActionFormatType,$RANparameterIDList :
$E2NodeRANparameterID [ ]],

```
$ricIndicationHeaderFormatType,
$ricIndicationMessageFormatType, $ricCallProcessIDFormatType]
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICCon
trolStyleList :
[$ricControlStyleType,$ricControlStyleName,$ricControlFormatT
ype, $ricControlHeaderFormatType,
$ricControlMessageFormatType,$ricCallProcessIDFormatType,
$ricControlOutcomeFormatType,$RANparameterIDList :
$E2NodeRANparameterID [ ], ]
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICPol
icyStyleList : [$ricPolicyStyleType,
$ricPolicyStyleName, $ricPolicyActionFormatType,
$RANparameterIDList : $E2NodeRANparameterID [ ],]
```

The following description correlates the attribute "E2NodeID" in the class "E2Node", via the class operation "E2NodeRANFunctionList:E2NodeRANFunctionName[ ]", to the attribute "E2NodeRANFunctionName:[ranFunctionShortName,ranFunctionE2SMO ID,ranFunctionDescription,ranFunctionInstance]" and the class operation "E2NodeSubFunctionTypeList:E2NodeSubFunctionTypeID[ ]" in the class "E2NodeRANFunction". Furthermore, this class operation "E2NodeSubFunctionTypeList:E2NodeSubFunctionTypeID[ ]" is correlated to the attribute "E2NodeSubFunctionTypeID" and the class operation "RICReportStyleList:[ricReportStyleType,ricReportStyleName,ri cReportActionFormatType,RANparameterIDList:E2NodeRANparameter ID[ ],ricIndicationHeaderFormatType,ricIndicationMessageFormat Type]" in the class "E2NodeRANSubFunction". Furthermore, this class operation "RICReportStyleList:[ricReportStyleType,ricReportStyleName,ri cReportActionFormatType,RANparameterIDList:E2NodeRANparameter ID[ ],ricIndicationHeaderFormatType,ricIndicationMessageFormat Type]" is correlated to the attribute "E2NodeRANparameterID" and the class operations "E2NodeRANParameterName", "E2NodeRANParameterType" in the class "E2NodeRANParameter".

The following description correlates the attribute "E2NodeID" in the class "E2Node", via the class operation "E2NodeRANFunctionList:E2NodeRANFunctionName[ ]", to the attribute "E2NodeRANFunctionName:[ranFunctionShortName,ranFunctionE2SMO ID,ranFunctionDescription,ranFunctionInstance]" and the class operation "E2NodeSubFunctionTypeList:E2NodeSubFunctionTypeID[ ]" in the class "E2NodeRANFunction". Furthermore, this class operation "E2NodeSubFunctionTypeList:E2NodeSubFunctionTypeID[ ]" is correlated to the attribute "E2NodeSubFunctionTypeID" and the class operation "RICInsertStyleList:[ricInsertStyleType,ricInsertStyleName,ri cInsertActionFormatType,RANparameterIDList:E2NodeRANparameter ID[ ],ricIndicationHeaderFormatType,ricIndicationMessageFormat Type,ricCallProcessIDFormatType]" in the class "E2NodeRANSubFunction". Furthermore, this class operation "RICInsertStyleList:[ricInsertStyleType,ricInsertStyleName,ri cInsertActionFormatType,RANparameterIDList:E2NodeRANparameter ID[ ],ricIndicationHeaderFormatType,ricIndicationMessageFormat Type,ricCallProcessIDFormatType]" is correlated to the attribute "E2NodeRANparameterID" and the class operations "E2NodeRANParameterName", "E2NodeRANParameterType" in the class "E2NodeRANParameter".

```
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICRep
ortStyleList:$RANparameterIDList
:$E2NodeRANparameterID:$E2NodeRANParameterName
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICRep
ortStyleList:$RANparameterIDList
:$E2NodeRANparameterID:$E2NodeRANParameterType
```

```
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICIns
ertStyleList:$RANparameterIDList
:$E2NodeRANparameterID:$E2NodeRANParameterName
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICIns
ertStyleList:$RANparameterIDList
:$E2NodeRANparameterID:$E2NodeRANParameterType
```

The following description correlates the attribute "E2NodeID" in the class "E2Node", via the class operation "E2NodeRANFunctionList: E2NodeRANFunctionName [ ]", to the attribute "E2NodeRANFunctionName: [ranFunctionShortName, ranFunctionE2SMO ID,ranFunctionDescription,ranFunctionInstance]" and the class operation "E2NodeSubFunctionTypeList:E2NodeSubFunctionTypeID[ ]" in the class "E2NodeRANFunction". Furthermore, this class operation "E2NodeSubFunctionTypeList: E2NodeSubFunctionTypeID[ ]" is correlated to the attribute "E2NodeSubFunctionTypeID" and the class operation "RICControlStyleList:[ricControlStyleType,ricControlStyleName, ricControlFormatType,ricControlHeaderFormatType,ricControlMe ssageFormatType,ricCallProcessIDFormatType,ricControlOutcomeF ormatType,RANparameterIDList:E2NodeRANparameterID[ ],]" in the class "E2NodeRANSubFunction". Furthermore, this class operation "RICControlStyleList:[ricControlStyleType,ricControlStyleName, ricControlFormatType,ricControlHeaderFormatType,ricControlMe ssageFormatType,ricCallProcessIDFormatType,ricControlOutcomeF ormatType,RANparameterIDList:E2NodeRANparameterID[ ],]" is correlated to the attribute "E2NodeRANparameterID" and the class operations "E2NodeRANParameterName", "E2NodeRANParameterType" in the class "E2NodeRANParameter".

The following description correlates the attribute "E2NodeID" in the class "E2Node", via the class operation "E2NodeRANFunctionList:E2NodeRANFunctionName[ ]", to the attribute "E2NodeRANFunctionName: [ranFunctionShortName, ranFunctionE2SMO ID,ranFunctionDescription,ranFunctionInstance]" and the class operation "E2NodeSubFunctionTypeList:E2NodeSubFunctionTypeID[ ]" in the class "E2NodeRANFunction". Furthermore, this class operation "E2NodeSubFunctionTypeList: E2NodeSubFunctionTypeID[ ]" is correlated to the attribute "E2NodeSubFunctionTypeID" and the class operation "RICPolicyStyleList: [ricPolicyStyleType,ricPolicyStyleName,ri cPolicyActionFormatType, RANparameterIDList: E2NodeRANparameter ID[ ],]" in the class "E2NodeRANSubFunction". Furthermore, this class operation "RICPolicyStyleList: [ricPolicyStyleType,ricPolicyStyleName,ri cPolicyActionFormatType, RANparameterIDList: E2NodeRANparameter ID[ ],]" is correlated to the attribute "E2NodeRANparameterID" and the class operations "E2NodeRANParameterName", "E2NodeRANParameterType" in the class "E2NodeRANParameter".

```
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICCon
trolStyleList:$RANparameterIDList
:$E2NodeRANparameterID:$E2NodeRANParameterName
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICCon
trolStyleList:$RANparameterIDList
:$E2NodeRANparameterID:$E2NodeRANParameterType
```

```
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICPol
icyStyleList:$RANparameterIDList
:$E2NodeRANparameterID:$E2NodeRANParameterName
E2Node:$E2NodeID:$E2NodeRANFunctionList:$E2NodeRANFunctionNam
e: [$ranFunctionShortName,
$ranFunctionE2SMOID, $ranFunctionDescription,
$ranFunctionInstance
]:$E2NodeSubFunctionTypeList:$E2NodeSubFunctionTypeID:$RICPol
icyStyleList:$RANparameterIDList
:$E2NodeRANparameterID:$E2NodeRANParameterType
```

Figure 12:
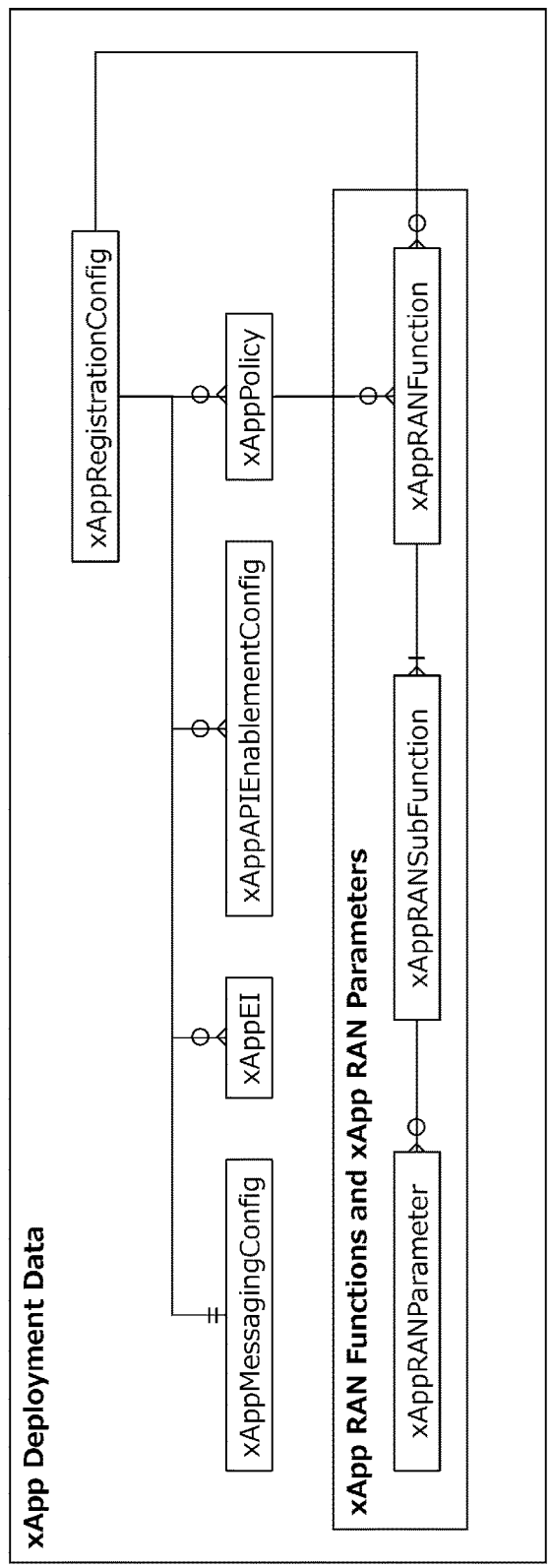
FIG. 12 schematically shows an example of the relationship between classes in the xApp deployment data of the platform database.

FIG. 12 schematically shows an example of the relationship between classes in the xApp deployment data of the platform database.

The following description correlates the class "xAppRegistrationConfig" in the xApp Deployment Data (FIG. 8) to the class "xAppAPIEnablementConfig". Specifically, the attribute "xAppID" in the class "xAppRegistrationConfig" is correlated, via the class operation "authorizedAPIList:APIType[ ]", to the attribute "APIType" and the class operations "authorizationStatus", "servingAreaInfo", "protocols", "Interfaces" in the class "xAppAPIEnablementConfig".

```
xAppRegistrationConfig:$xAppID:$authorizedAPIList:$APIType:$a
uthorizationStatus
xAppRegistrationConfig:$xAppID:$authorizedAPIList:$APIType:$s
ervingAreaInfo
xAppRegistrationConfig:$xAppID:$authorizedAPIList:$APIType:$p
rotocols
xAppRegistrationConfig:$xAppID:$authorizedAPIList:$APIType:$i
nterfaces
```

The following description correlates the class "xAppRegistrationConfig" in the xApp Deployment Data (FIG. 8) to the class "xAppMessagingConfig". Specifically, the attribute "xAppID" in the class "xAppRegistrationConfig" is correlated, via the class operation "xAppMessagingConfigID", to the attributes "xAppMessagingConfigID", "xAppID" and the class operations "hostname/IP", "port", "rxMessageList:messageType[ ]", "txMessageList:messageType[ ]" in the class "xAppMessagingConfig".

```
xAppRegistrationConfig:$xAppID:$xAppMessagingConfigID:$xAppID
:$hostname/IP
xAppRegistrationConfig:$xAppID:$xAppMessagingConfigID:$xAppID
:$port
xAppRegistrationConfig:$xAppID:$xAppMessagingConfigID:$xAppID
:$rxMessageList:messageType[ ]
xAppRegistrationConfig:$xAppID:$xAppMessagingConfigID:$xAppID
:$txMessageList:messageType[ ]
```

The following description correlates the class "xAppRegistrationConfig" in the xApp Deployment Data (FIG. 8) to the class "xAppPolicy". Specifically, the attribute "xAppID" in the class "xAppRegistrationConfig" is correlated, via the class operation "xAppPolicyIDList:xAppPolicyID[ ]", to the attribute "xAppPolicyID" and the class operations "xAppRANFunctionList:xAppRANFunctionName[ ]", "policyObject", "policyTypeObject", "policyStatusObject" in the class "xAppPolicy".

```
xAppRegistrationConfig:$xAppID:$xAppPolicyID:$xAppRANFunction
List:$xAppRANFunctionName[ ]
xAppRegistrationConfig:$xAppID:$xAppPolicyID:$policyObject
xAppRegistrationConfig:$xAppID:$xAppPolicyID:$policyTypeObjec
t
xAppRegistrationConfig:$xAppID:$xAppPolicyID:$policyStatusObj
ect
```

The following description correlates the class "xAppRegistrationConfig" in the xApp Deployment Data (FIG. 8) to the class "xAppEI". Specifically, the attribute "xAppID" in the class "xAppRegistrationConfig" is correlated, via the class operation "xAppEIJobIDList:xAppEIJobID[ ]", to the attribute "xAppEIJobID" and the class operations "eiTypeObject", "eiJobObject", "eiJobStatusObject" in the class "xAppEI".

```
xAppRegistrationConfig:$xAppID:$xAppEIJobID:$eiTypeObject
xAppRegistrationConfig:$xAppID:$xAppEIJobID:$eiJobObject
xAppRegistrationConfig:$xAppID:$xAppEIJobID:$eiJobStatusObjec
t
```

The following description correlates the xApp configured by the class "xAppRegistrationConfig" in the xApp Deployment Data (FIG. 8) to the classes "xAppRANFunction", "xAppRANSubFunction", "xAppRANParameter" in the xApp RAN Functions and xApp RAN Parameters (FIG. 7). As shown in FIG. 12, the class "xAppRegistrationConfig" and/or the xApp are correlated to the class "xAppRANFunction", the class "xAppRANFunction" is correlated to the class "xAppRANSubFunction", and the class "xAppRANSubFunction" is correlated to the class "xAppRANParameter".

The following description correlates the attribute "xAppID" in the class "xAppRegistrationConfig" and/or the xApp, via the class operation "xAppRANFunctionList:xAppRANFunctionName[ ]", to the attribute "xAppRANFunctionName:[ranFunctionShortName,ranFunctionE2SMOID, ranFunctionDescription,ranFunctionInstance]" and the class operations "xAppSubFunctionTypeList:xAppSubFunctionTypeID[ ]", "version" in the class "xAppRANFunction".

```
xApp:$xAppID:$xAppRANFunctionList:$xAppRANFunctionName:
[$ranFunctionShortName, $ranFunctionE2SMOID,
$ranFunctionDescription,
$ranFunctionInstance ]:$xAppSubFunctionTypeList:$xAppSubFunct
ionTypeID[ ]
xApp:$xAppID:$xAppRANFunctionList:$xAppRANFunctionName:
[$ranFunctionShortName, $ranFunctionE2SMOID,
$ranFunctionDescription, $ranFunctionInstance ]:$version
```

The following description correlates the attribute "xAppID" in the class "xAppRegistrationConfig" and/or the xApp, via the class operation "xAppRANFunctionList:xAppRANFunctionName[ ]", to the attribute "xAppRANFunctionName: [ranFunctionShortName, ranFunctionE2SMOID, ranFunctionDescription,ranFunctionInstance]" and the class operation "xAppSubFunctionTypeList:xAppSubFunctionTypeID[ ]" in the class "xAppRANFunction". Furthermore, this class operation "xAppSubFunctionTypeList:xAppSubFunctionTypeID[ ]" is correlated to the attribute "xAppSubFunctionTypeID" and the class operations "RICEventTriggerStyleList:[ricStyleType,ricStyleName,ricFormatType]",
"RICReportStyleList:[ricReportStyleType,ricReportStyleName,ri cReportActionFormatType,RANparameterIDList:xAppRANparameterID [ ],ricIndicationHeaderFormatType,ricIndicationMessageFormatType]",
"RICInsertStyleList:[ricInsertStyleType,ricInsertStyleName,ri cInsertActionFormatType,RANparameterIDList:xAppRANparameterID [ ],ricIndicationHeaderFormatType,ricIndicationMessageFormatType,ricCallProcessIDFormatType]",
"RICControlStyleList:[ricControlStyleType,ricControlStyleName ,ricControlFormatType,ricControlHeaderFormatType,ricControlMessageFormatType,ricCallProcessIDFormatType,ricControlOutcomeFormatType,RANparameterIDList:xAppRANparameterID[ ],]",
"RICPolicyStyleList:[ricPolicyStyleType,ricPolicyStyleName,ri cPolicyActionFormatType,RANparameterIDList:xAppRANparameterID [ ],]" in the class "xAppRANSubFunction".
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICEventTriggerStyleList:[$ricStyleType,$ricStyleName, ricFormatType]
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICReportStyleList :[$ricReportStyleType,$ricReportStyleName, $ricReportActionFormatType,$RANparameterIDList :$xAppRANparameterID[ ], $ricIndicationHeaderFormatType, $ricIndicationMessageFormatType]
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICInsertStyleList : [$ricInsertStyleType, $ricInsertStyleName, $ricInsertActionFormatType,$RANparameterIDList : $xAppRANparameterID [ ]], $ricIndicationHeaderFormatType, $ricIndicationMessageFormatType, $ricCallProcessIDFormatType]
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICControlStyleList :
[$ricControlStyleType,$ricControlStyleName,$ricControlFormatType, $ricControlHeaderFormatType, $ricControlMessageFormatType,$ricCallProcessIDFormatType, $ricControlOutcomeFormatType,$RANparameterIDList : $xAppRANparameterID [ ], ]
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICPolicyStyleList : [$ricPolicyStyleType, $ricPolicyStyleName, $ricPolicyActionFormatType, $RANparameterIDList : $xAppRANparameterID [ ],]

Figure 13:
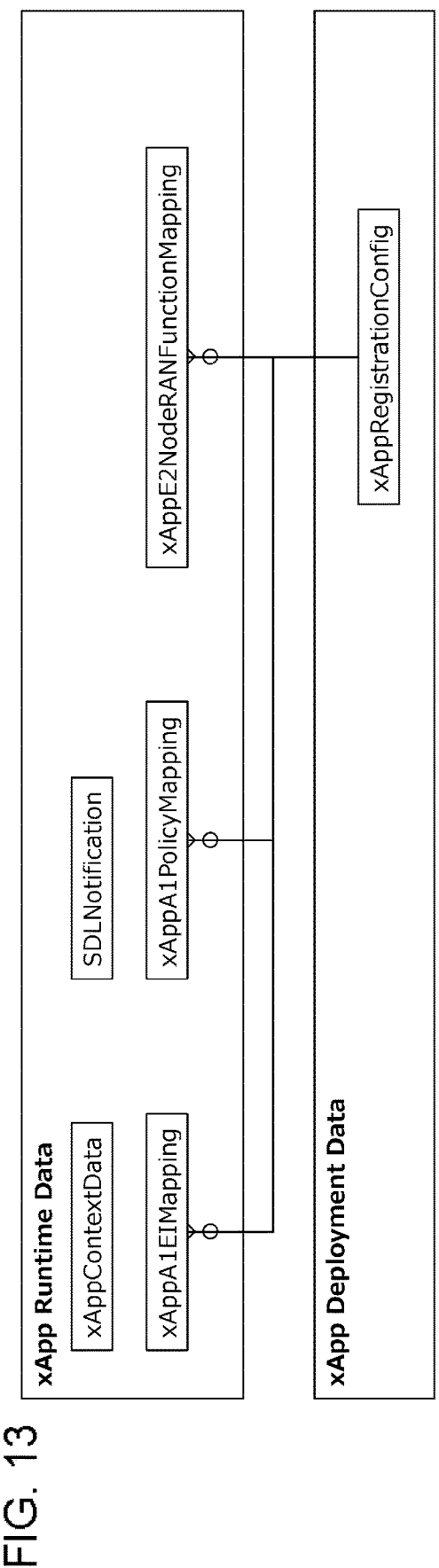
FIG. 13 schematically shows an example of the relationship between classes in the xApp deployment data and the xApp runtime data of the platform database.

The following description correlates the attribute "xAppID" in the class "xAppRegistrationConfig" and/or the xApp, via the class operation "xAppRANFunctionList:xAppRANFunctionName[ ]", to the attribute "xAppRANFunctionName: [ranFunctionShortName, ranFunctionE2SMOID, ranFunctionDescription,ranFunctionInstance]" and the class operation "xAppSubFunctionTypeList:xAppSubFunctionTypeID[ ]" in the class "xAppRANFunction". Furthermore, this class operation "xAppSubFunctionTypeList:xAppSubFunctionTypeID[ ]" is correlated to the attribute "xAppSubFunctionTypeID" and the class operation "RICReportStyleList:[ricReportStyleType,ricReportStyleName, ri cReportActionFormatType,RANparameterIDList:xAppRANparameterID [ ],ricIndicationHeaderFormatType, ricIndicationMessageFormatType]" in the class "xAppRANSubFunction". Furthermore, this class operation "RICReportStyleList:[ricReportStyleType,ricReportStyleName,ri cReportActionFormatType,RANparameterIDList:xAppRANparameterID [ ],ricIndicationHeaderFormatType,ricIndicationMessageFormatType]" is correlated to the attribute "xAppRANparameterID" and the class operations "xAppRANParameterName", "xAppRANParameterType" in the class "xAppRANParameter".
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICReportStyleList:$RANparameterIDList :$xAppRANparameterID:$xAppRANParameterName
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICReportStyleList:$RANparameterIDList :$xAppRANparameterID:$xAppRANParameterType The following description correlates the attribute "xAppID" in the class "xAppRegistrationConfig" and/or the xApp, via the class operation "xAppRANFunctionList:xAppRANFunctionName[ ]", to the attribute "xAppRANFunctionName:[ranFunctionShortName,ranFunctionE2SMOID, ranFunctionDescription,ranFunctionInstance]" and the class operation "xAppSubFunctionTypeList:xAppSubFunctionTypeID[ ]" in the class "xAppRANFunction". Furthermore, this class operation "xAppSubFunctionTypeList:xAppSubFunctionTypeID[ ]" is correlated to the attribute "xAppSubFunctionTypeID" and the class operation "RICInsertStyleList:[ricInsertStyleType,ricInsertStyleName,ri cInsertActionFormatType,RANparameterIDList:xAppRANparameterID [ ],ricIndicationHeaderFormatType, ricIndicationMessageFormatTy pe,ricCallProcessIDFormatType]" in the class "xAppRANSubFunction". Furthermore, this class operation "RICInsertStyleList:[ricInsertStyleType, ricInsertStyleName,ri cInsertActionFormatType,RANparameterIDList:xAppRANparameterID [ ],ricIndicationHeaderFormatType,ricIndicationMessageFormatType,ricCallProcessIDFormatType]" is correlated to the attribute "xAppRANparameterID" and the class operations "xAppRANParameterName", "xAppRANParameterType" in the class "xAppRANParameter".

xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICInsertStyleList:$RANparameterIDList :$xAppRANparameterID:$xAppRANParameterName
xApp:$xAppID:$xAppRANFunctionList:$xAppRANFunctionName: [$ranFunctionShortName, $ranFunctionE2SMOID, $ranFunctionDescription, $ranFunctionInstance
]:$xAppSubFunctionTypeList:$xAppSubFunctionTypeID:$RICInsertStyleList:$RANparameterIDList :$xAppRANparameterID:$xAppRANParameterType The following description correlates the attribute "xAppID" in the class "xAppRegistrationConfig" and/or the xApp, via the class operation "xAppRANFunctionList:xAppRANFunctionName[ ]", to the attribute "xAppRANFunctionName:[ranFunctionShortName,ranFunctionE2SMOID, ranFunctionDescription,ranFunctionInstance]" and the class operation "xAppSubFunctionTypeList:xAppSubFunctionTypeID[ ]" in the class "xAppRANFunction". Furthermore, this class operation "xAppSubFunctionTypeList:xAppSubFunctionTypeID[ ]" is correlated to the attribute "xAppSubFunctionTypeID" and the class operation "RICControlStyleList:[ricControlStyleType,ricControlStyleName, ricControlFormatType,ricControlHeaderFormatType,ricControlMe ssageFormatType,ricCallProcessIDFormatType, ricControlOutcomeF ormatType,RANparameterIDList: xAppRANparameterID[ ],]" in the class "xAppRANSubFunction". Furthermore, this class operation "RICControlStyleList:[ricControlStyleType,ricControlStyleName, ricControlFormatType,ricControlHeaderFormatType,ricControlMe ssageFormatType,ricCallProcessIDFormatType,ricControlOutcomeF ormatType,RANparameterIDList:xAppRANparameterID[ ],]" is correlated to the attribute "xAppRANparameterID" and the class operations "xAppRANParameterName", "xAppRANParameterType" in the class "xAppRANParameter".

xApp:$xAppID:$xAppRANFunctionList:$xAppRANFunctionName:
[$ranFunctionShortName, $ranFunctionE2SMOID,
$ranFunctionDescription, $ranFunctionInstance
]:$xAppSubFunctionTypeList:$xAppSubFunctionTypeID:$RICControl
StyleList:$RANparameterIDList
:$xAppRANparameterID:$xAppRANParameterName
xApp:$xAppID:$xAppRANFunctionList:$xAppRANFunctionName:
[$ranFunctionShortName, $ranFunctionE2SMOID,
$ranFunctionDescription, $ranFunctionInstance
]:$xAppSubFunctionTypeList:$xAppSubFunctionTypeID:$RICControl
StyleList:$RANparameterIDList
:$xAppRANparameterID:$xAppRANParameterType The following description correlates the attribute "xAppID" in the class "xAppRegistrationConfig" and/or the xApp, via the class operation "xAppRANFunctionList:xAppRANFunctionName[ ]", to the attribute "xAppRANFunctionName: [ranFunctionShortName, ranFunctionE2SMOID, ranFunctionDescription,ranFunctionInstance]" and the class operation "xAppSubFunctionTypeList:xAppSubFunctionTypeID[ ]" in the class "xAppRANFunction". Furthermore, this class operation "xAppSubFunctionTypeList:xAppSubFunctionTypeID[ ]" is correlated to the attribute "xAppSubFunctionTypeID" and the class operation "RICPolicyStyleList: [ricPolicyStyleType,ricPolicyStyleName,ri cPolicyActionFormatType, RANparameterIDList: xAppRANparameterID [ ],]" in the class "xAppRANSubFunction". Furthermore, this class operation "RICPolicyStyleList: [ricPolicyStyleType,ricPolicyStyleName,ri cPolicyActionFormatType, RANparameterIDList: xAppRANparameterID [ ],]" is correlated to the attribute "xAppRANparameterID" and the class operations "xAppRANParameterName", "xAppRANParameterType" in the class "xAppRANParameter".

xApp:$xAppID:$xAppRANFunctionList:$xAppRANFunctionName:
[$ranFunctionShortName, $ranFunctionE2SMOID,
$ranFunctionDescription, $ranFunctionInstance
]:$xAppSubFunctionTypeList:$xAppSubFunctionTypeID:$RICPolicyS
tyleList:$RANparameterIDList
:$xAppRANparameterID:$xAppRANParameterName xApp:$xAppID:$xAppRANFunctionList:$xAppRANFunctionName:
[$ranFunctionShortName, $ranFunctionE2SMOID,
$ranFunctionDescription, $ranFunctionInstance
]:$xAppSubFunctionTypeList:$xAppSubFunctionTypeID:$RICPolicyS
tyleList:$RANparameterIDList
:$xAppRANparameterID:$xAppRANParameterType FIG. 13 schematically shows an example of the relationship between classes in the xApp deployment data and the xApp runtime data of the platform database.

Figure 14:
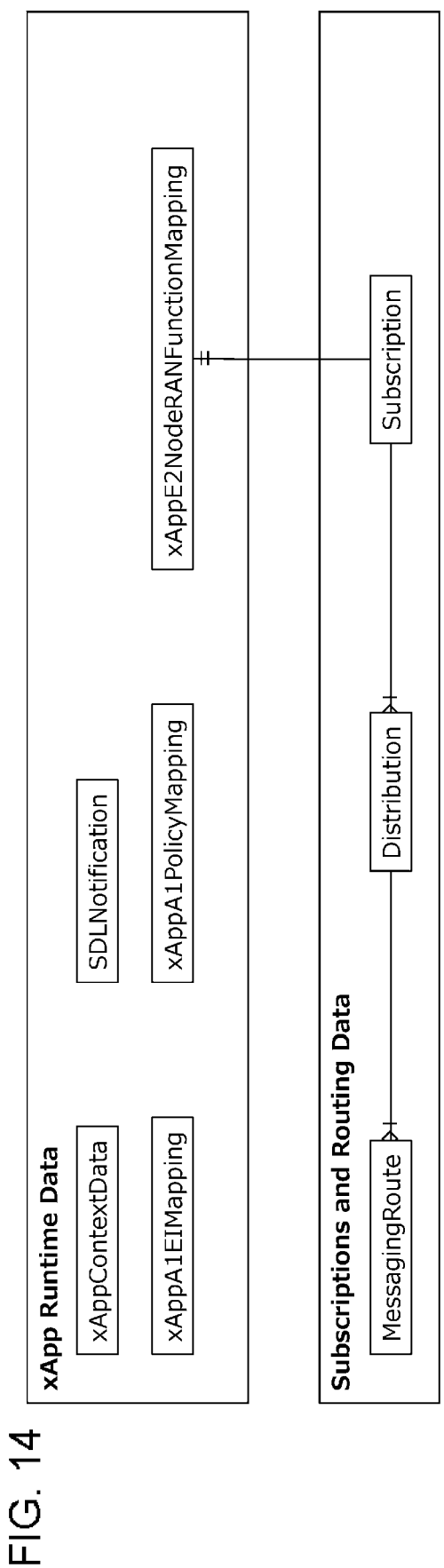
FIG. 14 schematically shows an example of the relationship between classes in the subscriptions/routing data and the xApp runtime data of the platform database.

The following description correlates the class "xAppRegistrationConfig" in the xApp Deployment Data (FIG. 8) to the classes "xAppA1EIMapping", "xAppA1PolicyMapping", "xAppE2NodeRANFunctionMapping" in xApp Runtime Data (FIG. 4). Specifically, the attribute "xAppID" in the class "xAppRegistrationConfig" is correlated; via the class operation "xAppEIJobIDList:xAppEIJobID[ ]", to the attribute "xAppA1EIMapping" and the class operation "eiJobID" in the class "xAppA1EIMapping"; via the class operation "xAppPolicyIDList:xAppPolicyID", to the attribute "xAppA1PolicyMapping" and the class operation "policyID" in the class "xAppA1PolicyMapping"; and via the class operation "xAppRANFunctionList:xAppRANFunctionName[ ]", to the attributes "xAppE2NodeRANFunctionMappingID", "xAppRANFunctioninstanceID" and the class operations "xAppRANFunctionName", "E2NodeRANFunctionName" in the class "xAppE2NodeRANFunctionMapping".

xAppRegistrationConfig:$xAppID:$xAppEIJobID::$xAppA1EIMapping
ID:eiJobID
xAppRegistrationConfig:$xAppID:$xAppA1PolicyMappinID:$policyI
D
xAppRegistrationConfig:$xAppID:$xAppE2NodeRANFunctionMappingI
D:$xAppRANFunctionInstanceID:$xAppRANFunctionName
xAppRegistrationConfig:$xAppID:$xAppE2NodeRANFunctionMappingI
D:$xAppRANFunctionInstanceID:$E2NodeRANFunctionName FIG. 14 schematically shows an example of the relationship between classes in the subscriptions/routing data and the xApp runtime data of the platform database.

The following description correlates the class "Subscription" in the Subscriptions and Routing Data (FIG. 6) to the classes "Distribution", "MessagingRoute" in the same figure and to the class "xAppE2NodeRANFunctionMapping" in the xApp Runtime Data (FIG. 4). Specifically, the attributes "requestID:[requestorID(xAppID),xAppInstanceID]", "subscriptionManagerInstanceID" in the class "Subscription" are correlated; via the class operation "xAppE2NodeRANFunctionMappingID", to the attributes "xAppE2NodeRANFunctionMappingID", "xAppRANFunctioninstanceID" and the class operations "xAppRANFunctionName", "E2NodeID", "E2NodeRANFunctionName" in the class "xAppE2NodeRANFunctionMapping"; via the class operation "distributionList:distributionID[ ]", to the attribute "distributionID" and the class operations "E2TerminationInstanceID", "eventTrigger:(from RANSubFunction)", "actionID: (from RANSubFunction)" in the class "Distribution"; and via the class operation "distributionList:distributionID[ ]", to the attributes "distributionID", "messagingRouteID", "messageType" and the class operations "senderEndPoint(hostname/IP.port-InstanceID)", "receiverEndPoint(hostname/IP.port-InstanceID=" in the class "MessagingRoute".

```
Subscription:$requestID:[requestorID(xAppID),
xAppInstanceID]:$subscriptionManagerInstanceID::$xAppE2NodeRA
NFunctionMappingID:$xAppRANFunctionInstanceID:
$xAppRANFunctionName
Subscription:$requestID[requestorID(xAppID),
xAppInstanceID]:$subscriptionManagerInstanceID:$xAppE2NodeRAN
FunctionMappingID:$xAppRANFunctionInstanceID:$
E2NodeID:$2NodeRANFunctionName
Subscription:$requestID[requestorID(xAppID),
xAppInstanceID]:$subscriptionManagerInstanceID:$E2Termination
InstanceID
Subscription:$requestID[requestorID(xAppID),
xAppInstanceID]:$subscriptionManagerInstanceID:$eventTrigger(
fromRANSubFunction)
Subscription:$requestID[requestorID(xAppID),
xAppInstanceID]:$subscriptionManagerInstanceID:$actionID(from
RANSubFunction)
Subscription:$requestID:[requestorID(xAppID),
xAppInstanceID]:$subscriptionManagerInstanceID:$distributionI
D:$messagingRouteID:$messageType:$senderEndPoint(hostname/IP.
port - InstanceID)
Subscription:$requestID:[requestorID(xAppID),
xAppInstanceID]:$subscriptionManagerInstanceID:$distributionI
D:$messagingRouteID:$messageType:$receiverEndPoint(hostname/I
P.port - InstanceID)
```

Figure 15:
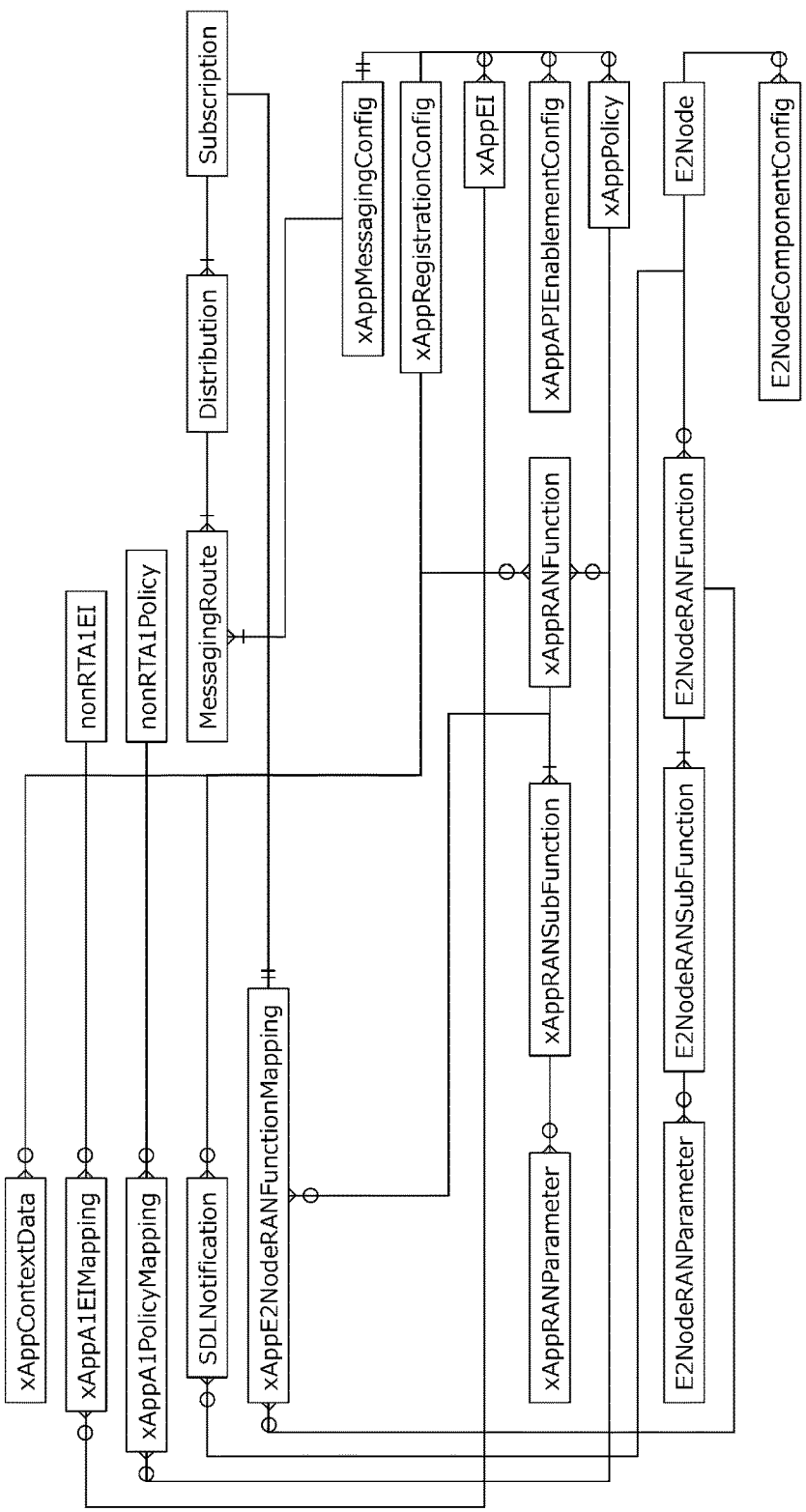
FIG. 15 shows a variation of the class relationship.

In addition to or instead of the class relationships illustrated in FIGS. 11 to 14 above, some or all of the class relationships illustrated in FIG. 15 may be adopted. In FIG. 15, the class "xAppContextData" is correlated to the class "xAppRegistrationConfig", the class "xAppA1EIMapping" is correlated to the classes "nonRTA1EI", "xAppEI", the class "xAppA1PolicyMapping" is correlated to the classes "nonRTA1Policy", "xAppPolicy", the class "SDLNotification" is correlated to the classes "xAppRegistrationConfig", "E2Node", the class "xAppE2NodeRANFunctionMapping" is correlated to the classes "Subscription", "xAppRANFunction", "E2NodeRANFunction", the class "MessagingRoute" is correlated to the classes "Distribution", "xAppMessagingConfig", the class "Distribution" is correlated to the class "Subscription", the class "xAppRANParameter" is correlated to the class "xAppRANSubFunction", the class "xAppRANSubFunction" is correlated to the class "xAppRANFunction", the class "xAppRANFunction" is correlated to the classes "xAppRegistrationConfig", "xAppPolicy", the class "E2NodeRANParameter" is correlated to the class "E2NodeRANSubFunction", the class "E2NodeRANSubFunction" is correlated to the class "E2NodeRANFunction", the class "E2NodeRANFunction" is correlated to the class "E2Node", the class "xAppMessagingConfig" is correlated to the class "xAppRegistrationConfig", the class "xAppEI" is correlated to the class "xAppRegistrationConfig", the class "xAppAPIEnablementConfig" is correlated to the class "xAppRegistrationConfig", the class "xAppPolicy" is correlated to the class "xAppRegistrationConfig", and the class "E2NodeComponentConfig" is correlated to the class "E2Node". The UML describing these relationships can be described in the similar way as in FIGS. 11 to 14, and is therefore omitted.

The present disclosure has been described above based on embodiments. It is obvious to those skilled in the art that various variations are possible in the combination of each component and/or each process in the exemplary embodiments, and that such variations are also encompassed within the scope of the present disclosure.

Although the structure of system and/or data of the Near-RT RIC was described in the embodiments of FIG. 3 etc., focusing on data that can be communicated via the E2 interface and/or the A1 interface, the structure of system and/or data of the Near-RT RIC can be defined similarly to the embodiments, also considering data that can be communicated via the O1 interface.

It should be noted that the structures, the operations, and the functions of each apparatus and/or each method described in the embodiments can be realized by hardware resources or software resources, or by the cooperation of hardware resources and software resources. As hardware resources, for example, processors, ROMs, RAMs and various integrated circuits can be used. As software resources, for example, programs such as operating systems and applications can be used.

The present disclosure may be expressed as the following items.

1. A radio access network control apparatus, wherein a class related to the E2 node is correlated to a class related to the E2 node component configuration, in the Near-RT RIC (Near-Real Time RAN Intelligent Controller) of the O-RAN.

2. A radio access network control apparatus, wherein a class related to the E2 node is correlated to a class related to the E2 node RAN function, in the Near-RT RIC (Near-Real Time RAN Intelligent Controller) of the O-RAN.

3. A radio access network control apparatus, wherein a class related to the xApp registration configuration is correlated to at least one of a class related to the xApp policy, a class related to the xApp messaging configuration, a class related to the xApp enrichment information, and a class related to the xApp API enablement configuration, in the Near-RT RIC (Near-Real Time RAN Intelligent Controller) of the O-RAN.

4. A radio access network control apparatus, wherein a class related to the xApp registration configuration is correlated to a class related to the xApp RAN function, in the Near-RT RIC (Near-Real Time RAN Intelligent Controller) of the O-RAN.

5. A radio access network control apparatus, wherein a class related to the xApp registration configuration is correlated to at least one of a class related to the xApp runtime A1 enrichment information mapping, a class related to the xApp runtime A1 policy mapping, and a class related to the xApp runtime E2 node RAN function mapping, in the Near-RT RIC (Near-Real Time RAN Intelligent Controller) of the O-RAN.

6. A radio access network control apparatus, wherein a class related to the subscription is correlated to a class related to the xApp runtime E2 node RAN function mapping, in the Near-RT RIC (Near-Real Time RAN Intelligent Controller) of the O-RAN.

This application claims priority of Japanese patent application 2022-005950, filed on Jan. 18, 2022, which is hereby incorporated by reference in its entirety.

The present disclosure relates to structure of system and/or data of the Near-RT RIC of the O-RAN.

What is claimed is:

1. A radio access network control apparatus of an open radio access network (O-RAN) comprising:
 a Near-Real Time RAN Intelligent Controller (Near-RT RIC) configured to correlate a class related to an E2 node to a class related to an E2 node component configuration.

2. The radio network control apparatus of claim 1, wherein the Near-RT RIC is configured to correlate the class related to the E2 node to a class related to the E2 node component configuration, through at least one of association, aggregation, composition, dependency, generalization, specialization, realization, or implementation.

3. A radio access network control apparatus of an open radio access network (O-RAN) comprising:
a Near-Real Time RAN Intelligent Controller (Near-RT RIC) configured to correlate a class related to an E2 node to a class related to an E2 node RAN function.

4. The radio network control apparatus of claim 3, wherein the Near-RT RIC is configured to correlate the class related to the E2 node to the class related to the E2 node RAN function, through at least one of association, aggregation, composition, dependency, generalization, specialization, realization, or implementation.

5. A radio access network control apparatus of an open radio access network (O-RAN) comprising:
a Near-Real Time RAN Intelligent Controller (Near-RT RIC) configured to correlate a class related to an xApp registration configuration to at least one of a class related to an xApp policy, a class related to an xApp messaging configuration, a class related to an xApp enrichment information, and a class related to an xApp API enablement configuration.

6. The radio network control apparatus of claim 5, wherein the Near-RT RIC is configured to correlate the class related to the xApp registration configuration to the at least one of the class related to the xApp policy, the class related to the xApp messaging configuration, the class related to the xApp enrichment information, and a class related to the xApp API enablement configuration, through at least one of association, aggregation, composition, dependency, generalization, specialization, realization, or implementation.

7. A radio access network control apparatus of an open radio access network (O-RAN) comprising:
a Near-Real Time RAN Intelligent Controller (Near-RT RIC) configured to correlate a class related to an xApp registration configuration to a class related to an xApp RAN function.

8. The radio network control apparatus of claim 7, wherein the Near-RT RIC is configured to correlate the class related to the xApp registration configuration to the class related to the xApp RAN function, through at least one of association, aggregation, composition, dependency, generalization, specialization, realization, or implementation.

9. A radio access network control apparatus of an open radio access network (O-RAN) comprising:
a Near-Real Time RAN Intelligent Controller (Near-RT RIC) configured to correlate a class related to an xApp registration configuration to at least one of a class related to an xApp runtime A1 enrichment information mapping, a class related to an xApp runtime A1 policy mapping, and a class related to an xApp runtime E2 node RAN function mapping.

10. The radio network control apparatus of claim 9, wherein the Near-RT RIC is configured to correlate the class related to the xApp registration configuration to the at least one of the class related to the xApp runtime A1 enrichment information mapping, the class related to the xApp runtime A1 policy mapping, and the class related to the xApp runtime E2 node RAN function mapping, through at least one of association, aggregation, composition, dependency, generalization, specialization, realization, or implementation.

11. A radio access network control apparatus of an open radio access network (O-RAN) comprising:
a Near-Real Time RAN Intelligent Controller (Near-RT RIC) configured to correlate a class related to the subscription to a class related to an xApp runtime E2 node RAN function mapping.

12. The radio network control apparatus of claim 11, wherein the Near-RT RIC is configured to correlate the class related to the subscription to the class related to the xApp runtime E2 node RAN function mapping, through at least one of association, aggregation, composition, dependency, generalization, specialization, realization, or implementation.

* * * * *